(12) United States Patent
Sugahara et al.

(10) Patent No.: US 11,015,757 B2
(45) Date of Patent: May 25, 2021

(54) PIPE-MAKING APPARATUS AND PIPE-MAKING METHOD

(71) Applicant: SEKISUI CHEMICAL CO., LTD., Osaka (JP)

(72) Inventors: Hiroshi Sugahara, Shiga (JP); Tatsurou Baba, Shiga (JP); Masahiro Yamasaki, Tokyo (JP); Yoshirou Sugiyama, Tokyo (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 157 days.

(21) Appl. No.: 16/088,317

(22) PCT Filed: Mar. 30, 2017

(86) PCT No.: PCT/JP2017/013247
§ 371 (c)(1),
(2) Date: Sep. 25, 2018

(87) PCT Pub. No.: WO2017/170866
PCT Pub. Date: Oct. 5, 2017

(65) Prior Publication Data
US 2019/0107240 A1   Apr. 11, 2019

(30) Foreign Application Priority Data
Mar. 31, 2016 (JP) .............. JP2016-070641

(51) Int. Cl.
*F16L 55/163* (2006.01)
*B29C 63/32* (2006.01)
(Continued)

(52) U.S. Cl.
CPC ........ *F16L 55/163* (2013.01); *B29C 63/0004* (2013.01); *B29C 63/32* (2013.01);
(Continued)

(58) Field of Classification Search
CPC ................................ B29C 63/32; B29C 53/78
See application file for complete search history.

(56) References Cited

U.S. PATENT DOCUMENTS

| 6,637,092 B1 | 10/2003 | Menzel et al. |
| 8,905,105 B2 * | 12/2014 | Yamane .................. F16L 55/18 |
| | | 156/425 |
| 2010/0008731 A1 | 1/2010 | Kakine et al. |

FOREIGN PATENT DOCUMENTS

| EP | 0 756 130 | 1/1997 |
| EP | 2 460 643 | 6/2012 |

(Continued)

OTHER PUBLICATIONS

International Search Report dated Jun. 20, 2017 in International (PCT) Application No. PCT/JP2017/013247.
(Continued)

*Primary Examiner* — Sean D Andrish
(74) *Attorney, Agent, or Firm* — Wenderoth, Lind & Ponack, L.L.P.

(57) ABSTRACT

The present invention provides a pipe-making apparatus and a pipe-making method capable of making a spiral pipe variably adjusting a diameter or a perimeter of the pipe without an inner periphery limiter. An edge 94 of a following strip portion 92 of a strip member 90 is fitted with a corresponding edge 93 of a preceding pipe portion 91 preceding by one turn by a pipe-making part 3a of a pipe-making apparatus 3, the following strip portion 92 following the preceding pipe portion 91 precedingly made into the spiral pipe, the following strip portion not yet made into the pipe. The pipe-making apparatus 3a is propelled along a spiral winding direction accompanying the fitting. A position 9q of the fitting is variably adjusted by a fitting
(Continued)

height adjuster such as an operating lever 30 in a machine height direction HD or a pipe inside-outside direction VD.

11 Claims, 31 Drawing Sheets

(51) Int. Cl.
*F16L 55/165* (2006.01)
*B29C 63/00* (2006.01)
*B29L 23/00* (2006.01)
*B29K 27/06* (2006.01)

(52) U.S. Cl.
CPC ...... *F16L 55/1655* (2013.01); *B29K 2027/06* (2013.01); *B29L 2023/22* (2013.01); *B29L 2023/225* (2013.01)

(56) References Cited

FOREIGN PATENT DOCUMENTS

| EP | 3 290 182 | 3/2018 |
|----|-----------|--------|
| JP | 2005-61545 | 3/2005 |
| JP | 4505142 | 7/2010 |
| JP | 4866428 | 2/2012 |
| JP | 2015-112790 | 6/2015 |
| JP | 2015-200410 | 11/2015 |
| KR | 10-0646802 | 11/2006 |

OTHER PUBLICATIONS

International Preliminary Report on Patentability and Written Opinion of the International Searching Authority dated Oct. 2, 2018 in International Application No. PCT/JP2017/013247.
Extended European Search Report dated Oct. 2, 2019 in corresponding European Patent Application No. 17775400.9.
Office Action dated Mar. 3, 2020 in corresponding Indian Patent Application No. 201817038356, with English Translation.
Office Action dated Jan. 28, 2020 in corresponding Korean Patent Application No. 10-2018-7031016 with English-language translation.
Extended European Search Report dated Aug. 20, 2020 in European Patent Application No. 20179811.3.
Office Action dated Mar. 2, 2021, in Indian Patent Application No. 202018037286.

\* cited by examiner

PIPE-MAKING APPARATUS AND PIPE-MAKING METHOD

FIELD OF THE INVENTION

The present invention relates to a pipe-making apparatus and a pipe-making method for making a spiral pipe by spirally winding a strip member, and particularly relates to what is called a self-propelled pipe-making apparatus that is propelled while making a pipe and a pipe-making method using the said pipe-making apparatus.

BACKGROUND ART

Existing underground pipes such as sewage pipes, water supply pipes, agricultural water pipes and gas pipes may be made of metal pipes or home pipes. This kind of existing pipes may be cracked or eroded due to aging after a long-term use, which may lead to water leakage, gas leakage, collapse, or the like. A known countermeasure is a rehabilitation method of lining an inner periphery of an existing pipe with a rehabilitation pipe made of synthetic resin. A spiral pipe formed by spirally winding a strip member made of synthetic resin is known as one example of the rehabilitation pipe.

A so-called self-propelled pipe-making apparatus is known as a pipe-making apparatus for making a spiral pipe. This kind of pipe-making apparatus is disposed in an extending end portion of a preceding pipe portion of a strip member that is precedingly made into a spiral pipe. An edge of a following strip portion that follows the preceding pipe portion and that is not yet made into the pipe is fitted with a corresponding edge of the preceding pipe portion preceding by one turn. Accompanying the fitting, the pipe-making apparatus is self-propelled (moved forward) along a spiral winding direction. Thereby, the spiral pipe is gradually extended (refer to Patent Documents 1, 2 or the like).

A diameter of the spiral pipe produced by this kind of pipe-making method may be reduced as the pipe-making proceeds. To cope with this problem, a pipe-making apparatus of Patent Document 1 includes an annular inner periphery limiter, which is a so-called link roller. An extending end portion of a preceding pipe portion is wound around the inner periphery limiter to prevent reduction in diameter. Further, a cross-section (including shape and diameter or perimeter) of a spiral pipe is limited from an inner peripheral side by the inner periphery limiter.

In a pipe-making apparatus of Patent Document 2, a plurality of support arms extend radially as an inner periphery limiter. An extending end portion of a preceding pipe portion is pressed against guide rollers in distal end portions of the support arms to prevent reduction in diameter. Further, a cross-section of a spiral pipe is limited from an inner peripheral side by the inner periphery limiter.

PRIOR ART DOCUMENTS

Patent Documents

Patent Document 1: Publication of Japanese Patent No. 4866428
Patent Document 2: Publication of Japanese Patent No. 4505142

SUMMARY OF THE INVENTION

Problem to be Solved by the Invention

Conventional pipe-making apparatus mentioned above are increased in size because of the annular inner periphery limiter (Patent Document 1) and the radial inner periphery limiter (Patent Document 2). Moreover, it is not easy for the pipe-making apparatus including the annular inner periphery limiter to cope with a change in an inner diameter or a cross sectional configuration of the existing pipe.

In view of the above, it is an object of the present invention to provide a pipe-making apparatus and a pipe-making method capable of making a spiral pipe variably adjusting a diameter or a perimeter without an inner periphery limiter.

Solution to the Problem

To solve the problems mentioned above, the present invention provides a pipe-making apparatus for making a spiral pipe by spirally winding a strip member while being propelled along a winding direction of the spiral winding, the apparatus including:

an apparatus frame disposed in an extending end portion of a precedingly spirally formed preceding pipe portion of the strip member;

a pipe-making part disposed in the apparatus frame, the pipe-making part fitting an edge of an unformed following strip portion of the strip member with a corresponding edge of the preceding pipe portion preceding by one turn, the following strip portion following the preceding pipe portion;

a fitting height adjuster variably adjusting a fitting position at which the fitting is done in a machine height direction or a pipe inside-outside direction of the spiral pipe, the machine height direction orthogonal to a propulsion front-rear direction of the apparatus frame; and the pipe-making being done in a condition in which the extending end portion is open to an inner peripheral side.

The condition in which the extending end portion is open to the inner peripheral side means a condition in which the pipe-making apparatus has a non-inner-periphery-limited structure without an inner periphery limiter that limits a cross-section (shape, perimeter and diameter) of the extending end portion of the preceding pipe portion from the inner peripheral side so that the extending end portion is not limited by the inner periphery limiter from the inner peripheral side.

In the pipe-making apparatus, a diameter of the spiral pipe can be enlarged by shifting the fitting position toward a bottom portion in the machine height direction or a pipe outside (outer peripheral side) in the pipe inside-outside direction by the fitting height adjuster. The diameter of the spiral pipe can be reduced by shifting the fitting position upward in the machine height direction or a pipe inside (inner peripheral side) in the pipe inside-outside direction by the fitting height adjuster. It is not required to limit an inner diameter of the spiral pipe with an inner periphery limiter.

In this Description, an "enlargement of diameter" means not only an increase in diameter of a spiral pipe having a circular cross-section but also an increase in perimeter (enlargement of perimeter) of a spiral pipe having any cross-sectional configuration. A "reduction of diameter" means not only a reduction in diameter of a spiral pipe having a circular cross-section but also a reduction in perimeter (reduction of perimeter) of a spiral pipe having any cross-sectional configuration.

The "extending end portion" means an approximate one turn portion in a front end of the preceding pipe portion in a direction in which the preceding pipe portion is extended along a pipe axis (extending direction). An "extension front" refers to a front in the extending direction and an "extension rear" refers to a rear in the extending direction.

Preferably, a machine width direction orthogonal to the propulsion front-rear direction of the apparatus frame and the machine height direction is angle-adjusted by the fitting height adjuster so as to be inclined with respect to a pipe axis of the spiral pipe.

In this arrangement, the fitting position can be variably adjusted in the pipe inside-outside direction, and the spiral pipe can be made with enlarged or reduced diameter. For example, the fitting position can be shifted to the outer peripheral side by adjusting the angle of the pipe-making apparatus such that the machine width direction (direction orthogonal to the propulsion front-rear direction and the machine height direction) is inclined to the outer peripheral side toward the extension front of the spiral pipe. Thereby, the pipe can be made with enlarged diameter. The fitting position can be shifted to the inner peripheral side by adjusting the angle of the pipe-making apparatus such that the machine width direction is inclined to the inner peripheral side toward the extension front of the spiral pipe. Thereby, the pipe can be made with reduced diameter.

More preferably, the fitting height adjuster includes an operating lever that is protruded from the apparatus frame and graspable.

With the operating lever, angle adjustment can be performed such that the machine width direction is inclined toward the pipe axis of the spiral pipe. Thereby, the spiral pipe can be made with enlarged or reduced diameter with a simple and inexpensive means.

The fitting height adjuster may include a strut member protruded from an outside of a first side or a second side in the machine width direction toward a pipe-outside in the pipe inside-outside direction, the strut member strutting by abutting against an inner peripheral surface of an outer periphery limiter surrounding the spiral pipe or an inner peripheral surface of the preceding pipe portion.

An entirety of the pipe-making apparatus can be inclined to the outer peripheral side toward the extension front by abutting the strut member against the inner peripheral surface of the preceding pipe portion. Thereby, the pipe can be made with enlarged diameter. The entirety of the pipe making apparatus can be inclined to the inner peripheral side toward the extension front by abutting the strut member against the outer periphery limiter. Thereby, the pipe can be made with reduced diameter.

Preferably, the fitting height adjuster includes
a pipe end engagement portion provided for engagement with the extending end portion of the preceding pipe portion and
a height adjusting mechanism that adjusts a position of the pipe end engagement portion with respect to the apparatus frame in the machine height direction.

By adjusting a height of the pipe end engagement portion with the height adjusting mechanism, a height of the fitting position engaged with the pipe end engagement portion can be adjusted. By shifting the fitting position to a basal side (side corresponding to the pipe outside in the pipe inside-outside direction) in the machine height direction, the pipe can be made with enlarged diameter. By shifting the fitting position to a head portion side (side corresponding to the pipe inside in the pipe inside-outside direction) in the machine height direction, the pipe can be made with reduced diameter.

Modes of engagement may include retaining, pressing, hooking and clamping.

More preferably, the pipe end engagement portion includes an inner peripheral side retainment member adopted to retain the extending end portion from the inner peripheral side and an outer peripheral side retainment member adopted to retain the extending end portion from the outer peripheral side.

In this arrangement, the extending end portion can be surely retained. The extending, end portion can be held from both the inner peripheral side and the outer peripheral side.

The pipe end engagement portion man be disposed in a vicinity of and in front of the fitting position in the propulsion front-rear direction.

The pipe end engagement portion may be disposed in a vicinity of and behind the fitting position in the propulsion front-rear direction.

The pipe end engagement portion may be disposed at the fitting position.

More preferably, the pipe-making part includes a drive roller and a pipe end guide, the drive roller obliquely pushing the following strip portion from the inner peripheral side of the extending end portion of the preceding pipe portion to the fitting position, the pipe end guide guiding the extending end portion.

In this arrangement, the spiral pipe can be surely made without the inner periphery limiter.

Preferably, the pipe end guide is retained at the extending end portion such that the pipe end guide is slidable in a peripheral direction.

More preferably, the pipe end guide includes a guide in front of the fitting position in the propulsion front-rear direction and a guide behind the fitting position in the propulsion front-rear direction.

In this arrangement, the fitting can be surely performed at the fitting position by guiding opposite side portions of the fitting position of the extending end portion. Further, the spiral pipe can be made in a stable manner.

The pipe end guide may include a pipe end inner periphery guide having a roller contacted with the inner peripheral surface of the extending end portion of the preceding pipe portion and
the fitting height adjuster may include an inner periphery guide angle adjusting mechanism that adjusts an angle of an axis of the pipe end inner periphery guide so as to be inclined with respect to a machine width direction orthogonal to the propulsion front-rear direction of the apparatus frame and the machine height direction.

By adjusting an inclination angle of the pipe end inner periphery guide by the inner periphery guide angle adjusting mechanism, an amount of shifting of the fitting position can be adjusted, and further, a degree of enlargement of diameter of the spiral pipe can be controlled.

The pipe end guide may include a pipe end inner periphery guide that guides the extending end portion from the inner peripheral side and a pipe end outer periphery guide that guides the extending end portion from the outer peripheral side,
the pipe end inner periphery guide may be protruded toward a pipe-outside with respect to a retainment portion of the pipe end outer periphery guide for the strip member in the pipe inside-outside direction and selectively placed either in front of or behind the pipe end outer periphery guide in the propulsion front-rear direction, and
the pipe end inner periphery guide and the pipe end outer periphery guide may constitute the fitting height adjuster.

The extending end portion is inclined to the outer peripheral side toward the extension front by placing the pipe end inner periphery guide in a propulsion rear with respect to the pipe end outer periphery guide, and the pipe can be made with enlarged diameter. The pipe can be made with reduced diameter by placing the pipe end inner periphery guide in a propulsion front with respect to the pipe end outer periphery guide.

The present invention provides a method for making a spiral pipe from a strip member with a pipe-making apparatus, the method including steps of:

fitting an edge of an unformed following strip portion of the strip member with a corresponding edge of a precedingly spirally formed preceding pipe portion preceding by one turn, the following strip portion following the preceding pipe portion;

propelling the pipe-making apparatus along a winding direction of the spiral pipe accompanying the fitting; and variably adjusting a fitting position at which the fitting is done in a machine height direction or a pipe inside-outside direction of the spiral pipe, the machine height direction orthogonal to a propulsion front-rear direction of the pipe-making apparatus; and wherein the pipe is made in a condition in which the extending end portion is open to an inner peripheral side.

The spiral pipe can be made with enlarged or reduced diameter by the adjusting step.

Preferably, a machine width direction orthogonal to the propulsion front-rear direction of the pipe-making apparatus and the machine height direction is angle-adjusted so as to be inclined with respect to a pipe axis of the spiral pipe in the variably adjusting step.

More preferably, the angle is adjusted with an operating lever disposed on the pipe-making apparatus so as to be protruded therefrom.

Advantageous Effects of the Invention

According to the present invention, a spiral pipe can be made variably adjusting a diameter or a perimeter without an inner periphery limiter.

BRIEF DESCRIPTION OF THE DRAWINGS

FIG. 4 (b) is a cross-sectional view taken along line IVb-IVb of FIG. 2.

FIG. 4 (c) is a cross-sectional view of the spiral pipe taken along line IVc-IVc of FIG. 2.

FIG. 27 (b) is a cross-sectional view of a portion surrounding a fitting portion of a spiral pipe according to the seventh embodiment.

DESCRIPTION OF THE PREFERRED EMBODIMENTS

Embodiments of the present invention will be described hereinafter with reference to the drawings.

First Embodiment

Figure 1:
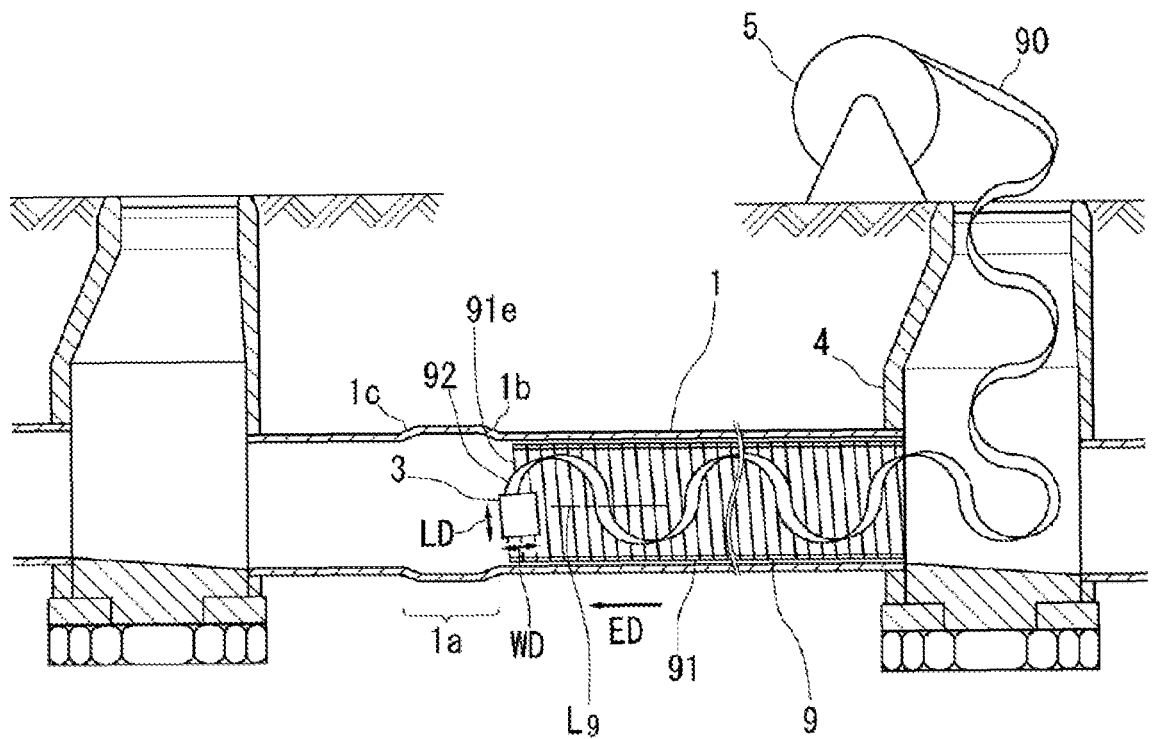
FIG. 1 is a cross-sectional view, showing an existing pipe in a process of rehabilitation by lining with a rehabilitation pipe composed of a spiral pipe.

FIG. 1 shows an aged existing pipe 1 in a process of being rehabilitated. The existing pipe 1 may be a sewer pipe, a water supply pipe, an agricultural water pipe, a water conduit for hydroelectric power generation, a gas pipe, or the like.

A lining of a rehabilitation pipe 9 is provided on an inner wall of the existing pipe 1. The rehabilitation pipe 9 is made of an elongated strip member 90 into a form of a spiral pipe. The rehabilitation pipe 9 is referred to as a "spiral pipe 9" as appropriate.

Figure 4A:
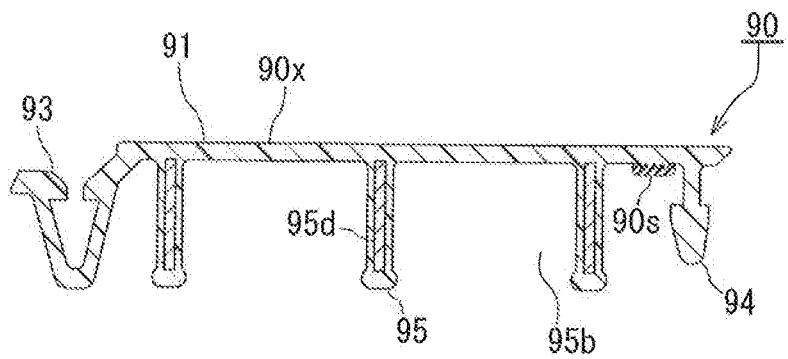
FIG. 4 (a) is a cross-sectional view of a strip member constituting the spiral pipe taken along line IVa-IVa of FIG. 2.

As shown in FIG. 4(a), the strip member 90 includes a flat strip portion 90x, a first fitting portion 93, a second fitting portion 94 and a plurality of ribs 95. The strip member 90 has a constant cross-section and extends in a direction generally orthogonal to the plane of FIG. 4(a). A front side surface (top surface in FIG. 4(a)) of the flat strip portion 90x constitutes an inner peripheral surface of the spiral pipe 9. A back surface (under surface in FIG. 4(a)) of the flat strip portion 90x is oriented to an outer periphery of the spiral pipe 9. Ribs 95 are disposed in the back surface to form a groove 95b.

A first fitting portion 93 having a concave configuration is formed in an edge of the flat strip portion 90x on a first side (left side in FIG. 4(a)) in a width direction. A second fitting portion 94 having a convex configuration is formed in an edge of the flat strip portion 90x on a second side (right side in FIG. 4(a)) in the width direction. A concave portion of the first fitting portion 93 and a convex portion of a second fitting portion 94 have mutually complementary configurations.

Figure 4B:
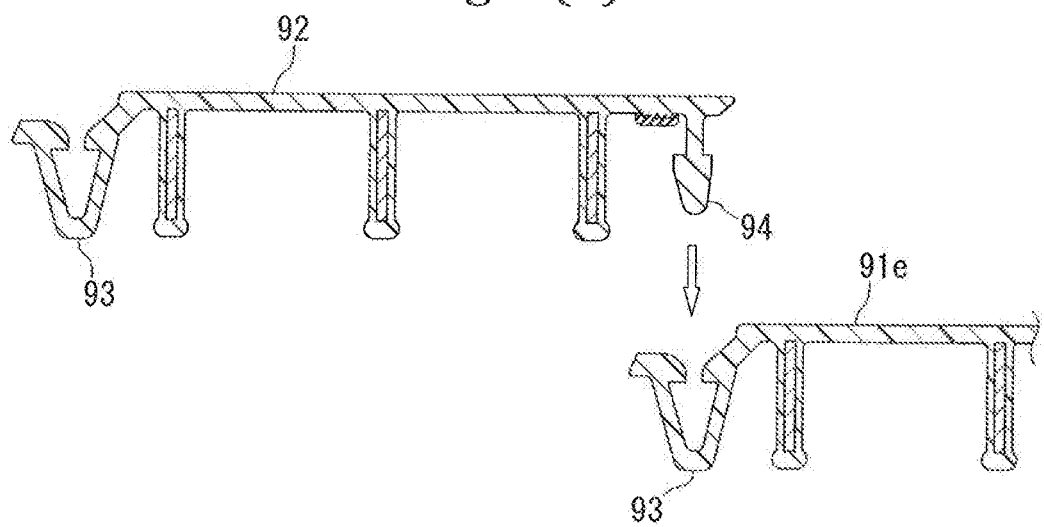
Figure 4C:
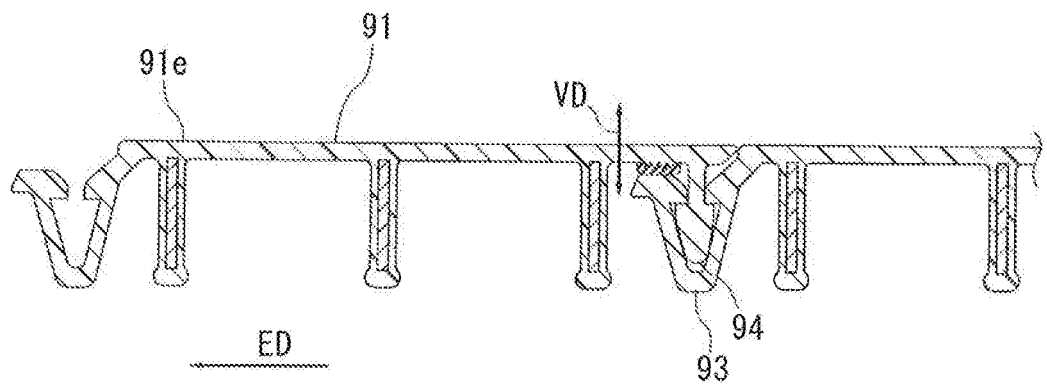

As shown in FIGS. 4(b) and 4(C), the fitting portions 93, 94 of adjacent turns of the spiral pipe 9 are joined in a concave-convex fitting.

A general entirety of the strip member 90 is made of a synthetic resin such as polyvinyl chloride, for example. A reinforcement strip 95d made of metal such as steel is embedded in the ribs 95. A seal 90s (shown only in FIG. 4) composed of a rubber water stop or the like is disposed near the fitting portions 93, 94 of the flat strip portion 90x.

Figure 3:
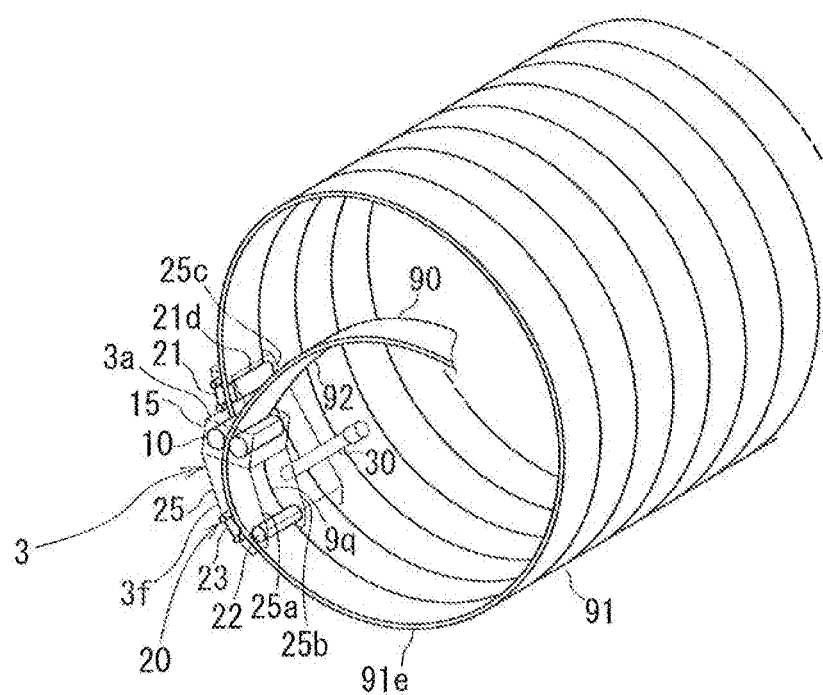
FIG. 3 is an illustrative perspective view of the spiral pipe in a process of being made with the pipe-making apparatus.

As shown in FIG. 1 and FIG. 3, the strip member 90 in a process of pipe-making includes a preceding pipe portion 91 that is already made into a pipe and a following strip portion 92 that follows the preceding pipe portion 91 and that is not yet made into the pipe. The preceding pipe portion 91 having a spiral pipe configuration is formed by the strip member 90's being wound in a spiral winding direction. The preceding pipe portion 91 is gradually extended along a pipe axis $L_9$ of the preceding pipe portion 91. An approximate one turn portion in a front end (left end in FIG. 1) of the preceding pipe portion 91 in an extending direction ED along the pipe axis $L_9$ is referred to as an "extending end portion 91e".

As shown in FIG. 1 and FIG. 3, from a winding drum 5 on the ground, the following strip portion 92 is passed through an inside of the preceding pipe portion 91 via a manhole 4 and continues to the extending end portion 91e of the preceding pipe portion 91. As shown in FIG. 4(b), a width direction of the strip member 90 in the preceding pipe portion 91 and the following strip portion 92 continuously adjacent to each other is generally along the extending direction ED. The first fitting portion 93 is oriented forward in the extending direction ED (referred to as "extension front" hereinafter as appropriate, leftward in FIG. 4(b)) and the second fitting portion 94 is oriented rearward in the extending direction ED (referred to as "extension rear" hereinafter as appropriate, rightward in FIG. 4(b)).

Figure 2:
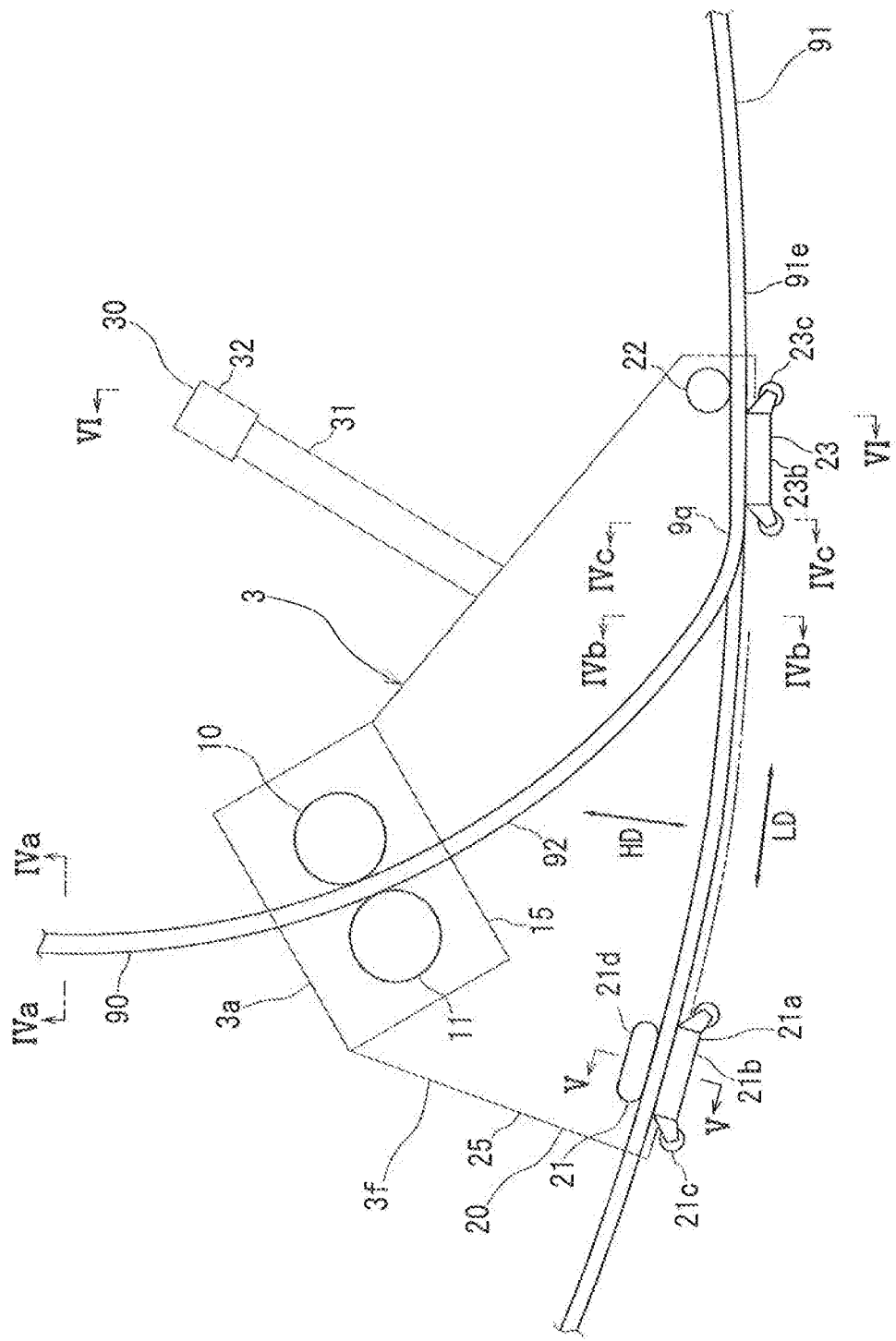
FIG. 2 is an illustrative side view of a pipe-making apparatus according to a first embodiment of the present invention, seen from an extension front.

As shown in FIG. 1 to FIG. 3, a pipe-making apparatus 3 is disposed on the extending end portion 91e of the preceding pipe portion 91. The pipe-making apparatus 3 is propelled in a clockwise direction in FIG. 3 along the spiral winding direction while making the spiral pipe 9.

As shown in FIG. 1, a propulsion front-rear direction LD of the pipe-making apparatus 3 is along the winding direction. A width, direction WD of the pipe-making apparatus 3 is orthogonal to the winding direction and is generally along the pipe axis $L_9$ of the spiral pipe 9. As shown in. FIG. 2, a height direction HD of the pipe-making apparatus 3 (further of an apparatus frame 3f to be described later) is orthogonal to the width direction WD and the propulsion front-rear direction LD and is oriented to a pipe inside-outside direction (radial direction) of the spiral pipe 9.

The pipe-making apparatus 3 has a non-inner-periphery-limited structure. That is, the pipe-making apparatus 3 does not have an inner periphery limiter that limits a cross-section (shape, perimeter, diameter) of the extending end portion 91e of the preceding pipe portion 91 from an inner peripheral side. Pipe making is performed with the extending end portion 91e open to the inner peripheral side.

Specifically, as shown in FIG. 2 and FIG. 3, the pipe-making apparatus 3 includes the apparatus frame 3f, a pipe-making part 3a and a fitting height adjuster 30.

As shown in FIG. 2 and FIG. 3 in a simplified manner, the apparatus frame 3f includes a drive unit frame 15 and a guide frame 25.

Figure 6:
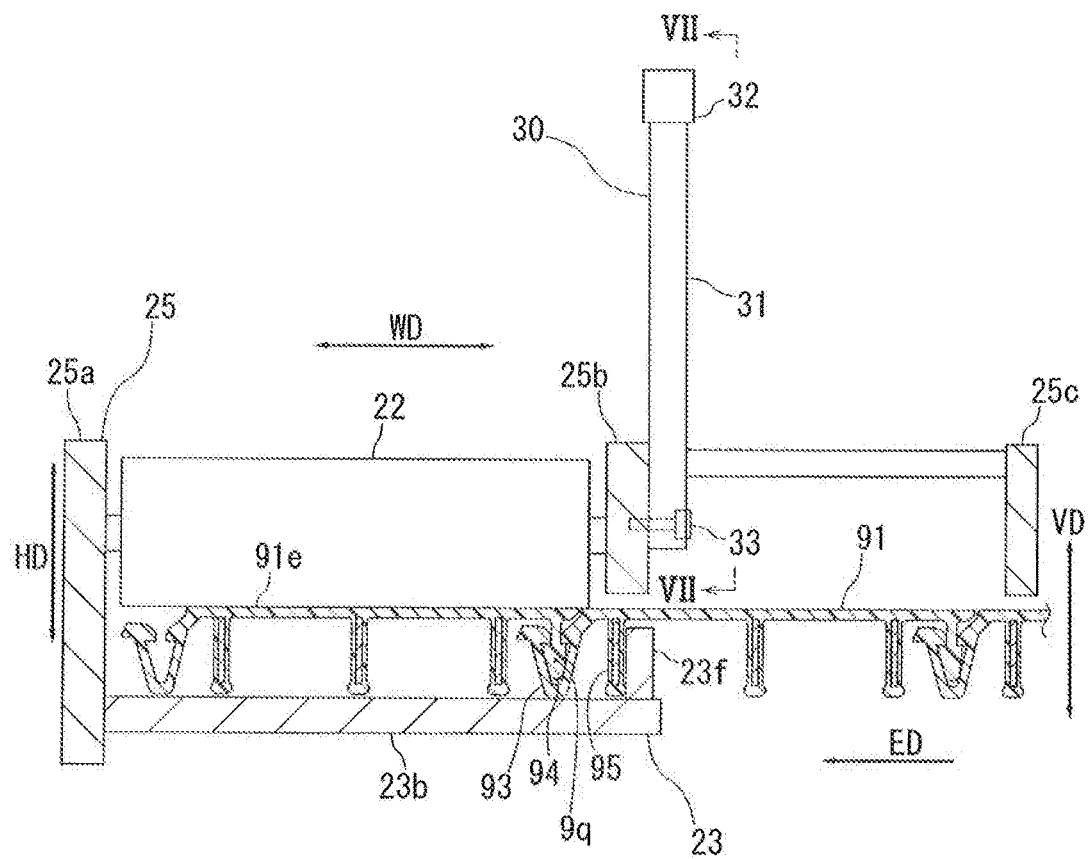
FIG. 6 is a cross-sectional view of the pipe-making apparatus taken along line VI-VI of FIG. 2.

As shown in FIG. 2, the drive unit frame 15 is disposed on the pipe-making apparatus 3 in a front side portion (left in FIG. 2) in the propulsion front-rear direction LD and a head portion (top in FIG. 2) in the machine height direction HD of the pipe-making apparatus 3. The guide frame 25 extends from the drive unit frame 15 rearward in the propulsion front-rear direction LD (referred to as "propulsion rear" hereinafter) and toward a basal portion side (downward in FIG. 2) in the machine height direction HD. As shown in FIG. 6, the guide frame 25 includes three frame plates 25a, 25b, 25c. The frame plates 25a, 25b, 25c are arranged in the pipe-making width direction WD of the pipe-making apparatus. (left-right in FIG. 6).

The apparatus frame 3f is provided with the pipe-making part 3a.

The pipe-making part 3a makes the spiral pipe 9 by fitting one edge (second fitting portion 94) of the following strip portion 92 with an opposite edge (first fitting portion 93) of the preceding pipe portion 91 preceding by one turn. As shown in FIG. 2 and FIG. 3, the fitting is made at one portion of the extending end portion 91e of the preceding pipe portion 91 in a peripheral direction. The one portion in the peripheral direction is referred to as a fitting position 9q.

Specifically, as shown in FIG. 2 and FIG. 3, the pipe-making part 3a includes a drive unit 10 (drive part) and a pipe end guide unit 20.

The drive unit 10 includes a pair of driving rollers 11 and is contained in the drive unit frame 15. Axes of the driving rollers 11 are oriented in the machine width direction WD. The following strip portion 92 is caught between the pair of driving rollers 11.

The driving rollers 11 push the following strip portion 92 obliquely toward the fitting position 9q from an inner peripheral side of the extending end portion 91e of the preceding pipe portion 91.

The pipe end guide unit 20 is disposed in the basal portion (bottom side portion in FIG. 2) of the pipe-making apparatus 3 in the height direction HD. The pipe end guide unit 20 includes a front side pipe end guide 21, a rear side pipe end inner periphery guide 22 and a rear side pipe end outer periphery guide 23. The guides 21, 22, 23 are incorporated in the guide frame 25 and retained (engaged) so as to be movable with respect to the extending end portion 91e of the preceding pipe portion 91 in the propulsion front-rear direction LD.

As shown in FIG. 2 and FIG. 3, the front side pipe end guide 21 is disposed in a front of the pipe-making apparatus 3 in the propulsion front-rear direction LD (referred to as "propulsion front" hereinafter, left in FIG. 2) with respect to the fitting position 9q. Moreover, the front side pipe end guide 21 is disposed out of alignment with the driving rollers 11 of the drive unit 10 to a first side in the machine width direction WD (back side on the plane of FIG. 2) by one pitch of the spiral pipe 9.

The front side pipe end guide 21 is disposed in a portion of the extending end portion 91e of the preceding pipe portion 91 preceding the fitting position 9q by less than one turn in a counter-clockwise direction in FIG. 3.

As shown in FIG. 2, the front side pipe end guide 21 includes an outer periphery guide portion 21a (pipe end outer periphery guide) on the basal portion side and a pressing member 21d on the head portion side in the machine height direction HD. The portion of the extending end portion 91e of the preceding pipe portion 91 preceding by less than one turn is caught by the outer periphery guide portion 21a and the pressing member 21d from the outer peripheral side and the inner peripheral side.

Figure 5:
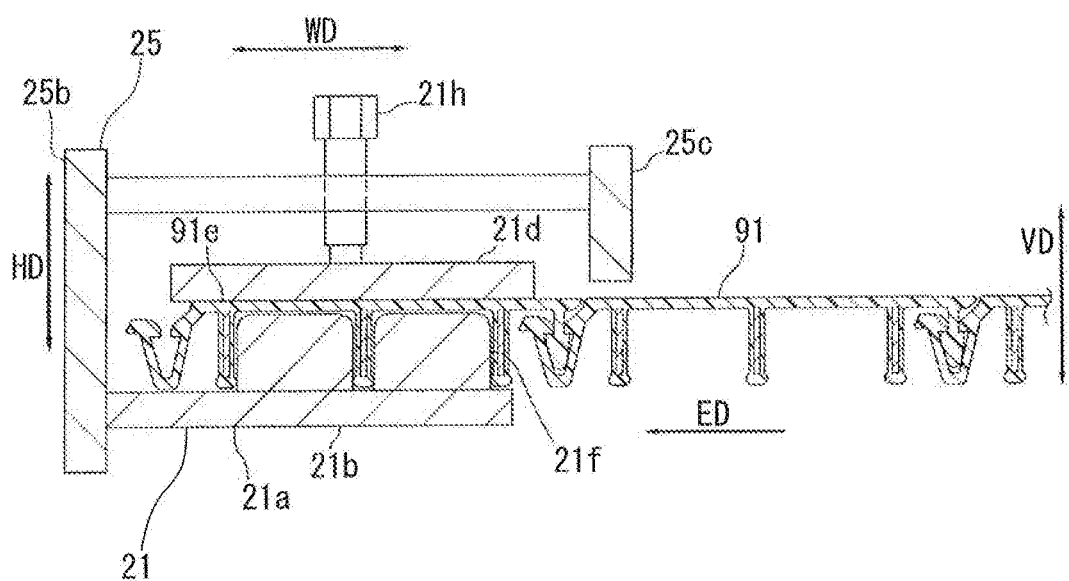
FIG. 5 is a cross-sectional view of a front side pipe end guide of the pipe-making apparatus taken along line V-V of FIG. 2.

As shown in FIG. 5, the outer periphery guide portion 21a includes an outer periphery guide plate 21b and two (plurality of) retainment protrusions 21f. The outer periphery guide plate 21b is placed on an outer surface of the extending end portion 91e of the preceding pipe portion 91.

As shown in FIG. 2, the outer periphery guide plate 21b is provided with rollers 21c in front and rear side portions thereof. The rollers 21c are rolled contacted with an inner periphery of the existing pipe 1.

As shown in FIG. 5, the retainment protrusion 21f is protruded from the outer periphery guide plate 21b toward the pressing member 21d. The retainment protrusion 21f is retained in the groove 95b of the preceding pipe portion 91 so as to be slidable in the propulsion front-rear direction LD.

The pressing member 21d is pressed against an inner peripheral surface of the extending end portion 91e of the preceding pipe portion 91. A pressing force can be controlled by a bolt 21h (pressing force controller) as appropriate.

Accompanying the propulsion of the pipe-making apparatus 3, a frictional resistance is generated between the front side pipe end guide 21 and the preceding pipe portion 91. A magnitude of the frictional resistance can be controlled by the retainment protrusion 21f as appropriate.

As shown in FIG. 2 and FIG. 3, the rear side pipe end outer periphery guide 23 is disposed spaced from the front side pipe end guide 21 to the propulsion rear. And the pipe end outer periphery guide 23 is disposed at a same position as the driving roller 11 in the machine width direction WD.

The fitting position 9q is located near the pipe end outer periphery guide 23 in the propulsion front-rear direction LD of the pipe-making apparatus 3 or on the pipe end outer periphery guide 23.

As shown in FIG. 6, the pipe end outer periphery guide 23 includes an outer periphery guide plate 23b and a retainment protrusion 23f. The outer periphery guide plate 23b is placed on an outer surface of the preceding pipe portion 91 so as to be laid over a portion of the extending end portion 91e of the preceding pipe portion 91 and another portion thereof preceding by one turn.

As shown in FIG. 2, the outer periphery guide plate 23b is provided with rollers 23c in front and rear side portions thereof. The rollers 23c are rolled contacted with an inner peripheral surface of the existing pipe 1.

As shown in FIG. 6, the outer periphery guide plate 23b is provided with the retainment protrusion 23f in one end portion thereof in the machine width direction WD. The retainment protrusion 23f is retained by the rib 95 of the portion of the preceding pipe portion 91 preceding by one turn.

As shown in FIG. 2 and FIG. 3, the pipe end inner periphery guide 22 is disposed to the propulsion rear with respect to the pipe end outer periphery guide 23, and further to the fitting position 9q. The pipe end inner periphery guide 22 has a shape of a roller with an axis thereof oriented to the pipe-making width direction WD. The pipe end inner periphery guide 22 is laid slightly over a portion of the extending end portion 91e of the preceding pipe portion 91 and another portion thereof preceding by one turn. The pipe end inner periphery guide 22 is pressed against an inner peripheral surface of the preceding pipe portion 91.

As shown in FIG. 2 and FIG. 3, the pipe-making apparatus 3 is provided with the operating lever 30 as the fitting height adjuster.

As shown in FIG. 6, the operating lever 30 includes a lever part 31 and a grasping part 32. A basal end portion of the lever part 31 is connected to the apparatus frame 3f via a connecting bolt 33. The lever part 31 is protruded from the apparatus frame 3f upward in the machine height direction HD of the pipe-making apparatus 3 or toward a pipe inside of the spiral pipe 9. The grasping part 32 is disposed in a distal end portion of the lever part 31.

A length of the operating lever 30 is preferably a length that allows an operator to apply a force easily in a standing position, which may be 50 to 150 cm, for example.

Figure 7:
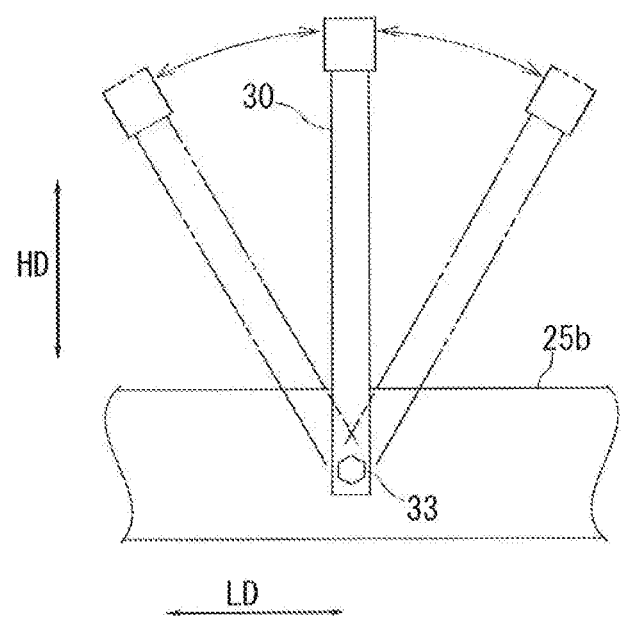
FIG. 7 is a side view of an operating lever of the pipe-making apparatus taken along line VII-VII of FIG. 6.

As indicated by chain double-dashed lines in FIG. 7, an angle of the operating lever 30 can be adjusted about an axis of the connecting bolt 33 so as to be inclined to the propulsion front-rear direction LD by loosening the connecting bolt 33. By tightening the connecting bolt 33, the operating lever 30 is fixed to the apparatus frame 3f. Thereby, the operating lever 30 can be fixed after the angle adjustment to allow the operator to operate the operating lever 30 easily.

The operating lever 30 may be fixed to the apparatus frame 3f in an angle-uncontrollable manner.

The operating lever 30 is attached to the middle frame plate 25b of the apparatus frame 3f. Alternatively, the operating lever 30 may be attached to the frame plate 25a on the extension front side (left in FIG. 6). The operating lever 30 may be attached to the frame plate 25c on the extension rear side (right in FIG. 6). An attaching position of the operating lever 30 is not specifically limited as long as the operating lever 30 can be securely fixed to the apparatus frame 3f.

The rehabilitation pipe 9 (spiral pipe) is made with the pipe-making apparatus 3 in the following manner to rehabilitate the existing pipe 1.

As shown in FIG. 2, the following strip portion 92 is pushed out of the drive unit 10 obliquely toward the fitting position 9q by driving the driving roller 11.

Thereby, as shown in FIGS. 4(b) and 4(c), the second fitting portion 94 of the following strip portion 92 and the first fitting portion 93 of a portion of the preceding pipe portion 91 preceding by one turn are fitted at the fitting position 9q (fitting step). At this time, the outer periphery guide plate 21b, 23b receives a force of the fitting from an outer peripheral side of the preceding pipe portion 91.

Moreover, a propulsive reaction force is generated by the fitting, and the pipe-making apparatus 3 is spirally propelled in the clockwise direction in FIG. 3 (propelling step). Thereby, the rehabilitation pipe 9 can be made along an inner surface of the existing pipe 1 as the pipe-making apparatus 3 is self-propelled.

The pipe end guides 21, 22, 23 are retained (engaged) so as to be relatively movable in a winding direction of the extending end portion 91e of the preceding pipe portion 91, and thereby the pipe-making apparatus 3 can be guided in the winding direction.

Moreover, the pipe end inner periphery guide 22 is pressed against a portion of the preceding pipe portion 91 that has passed the fitting position 9q from the inner peripheral side, and thereby the fitting portions 93, 94 can be further surely fitted together, and an insufficient fitting can be prevented.

In the pipe-fitting apparatus 3, a pipe can be made without the annular inner periphery limiter of the Patent Document 1 or the radial inner periphery limiter of the Patent Document 2. Therefore, the pipe-making apparatus 3 can be downsized.

Since the operating lever 30 is disposed in the pipe-making apparatus 3 so as to be protruded, the operator can support the pipe-making apparatus 3 by holding the operating lever 30. Accordingly, pipe-making can be performed keeping the pipe-making apparatus 3 in a stable attitude.

As shown in FIG. 1, the existing pipe 1 may not have a constant inner diameter or a constant cross-sectional configuration throughout an entire length, and a cross-section changed portion 1a may be formed.

The pipe-making apparatus 3 can cope with such a cross-sectional change of the existing pipe 1. That is, according to the cross-sectional change, an angle adjustment is made with the operating lever 30 such that the machine width direction WD of the pipe-making apparatus 3 is inclined with respect to the pipe axis $L_9$. Thereby, the fitting position 9q is variably adjusted in the pipe inside-outside direction VD at the fitting position 9q (fitting position adjusting step). By the variable adjustment of the fitting position 9q, the spiral pipe 9 can be made with enlarged or reduced diameter.

Figure 8:
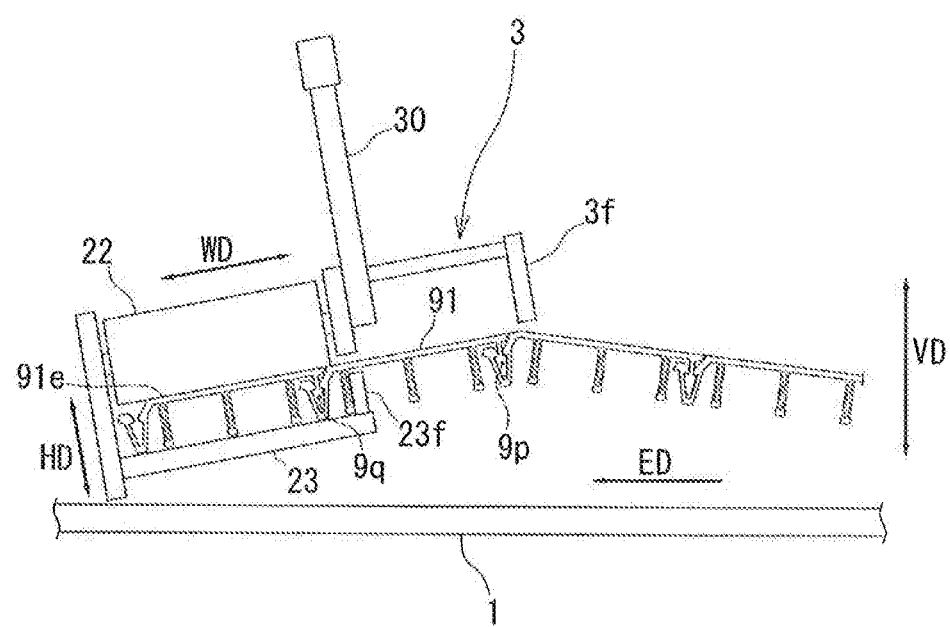
FIG. 8 is a cross-sectional view, showing a pipe in a process of being made with enlarged diameter according to the first embodiment.
Figure 10:
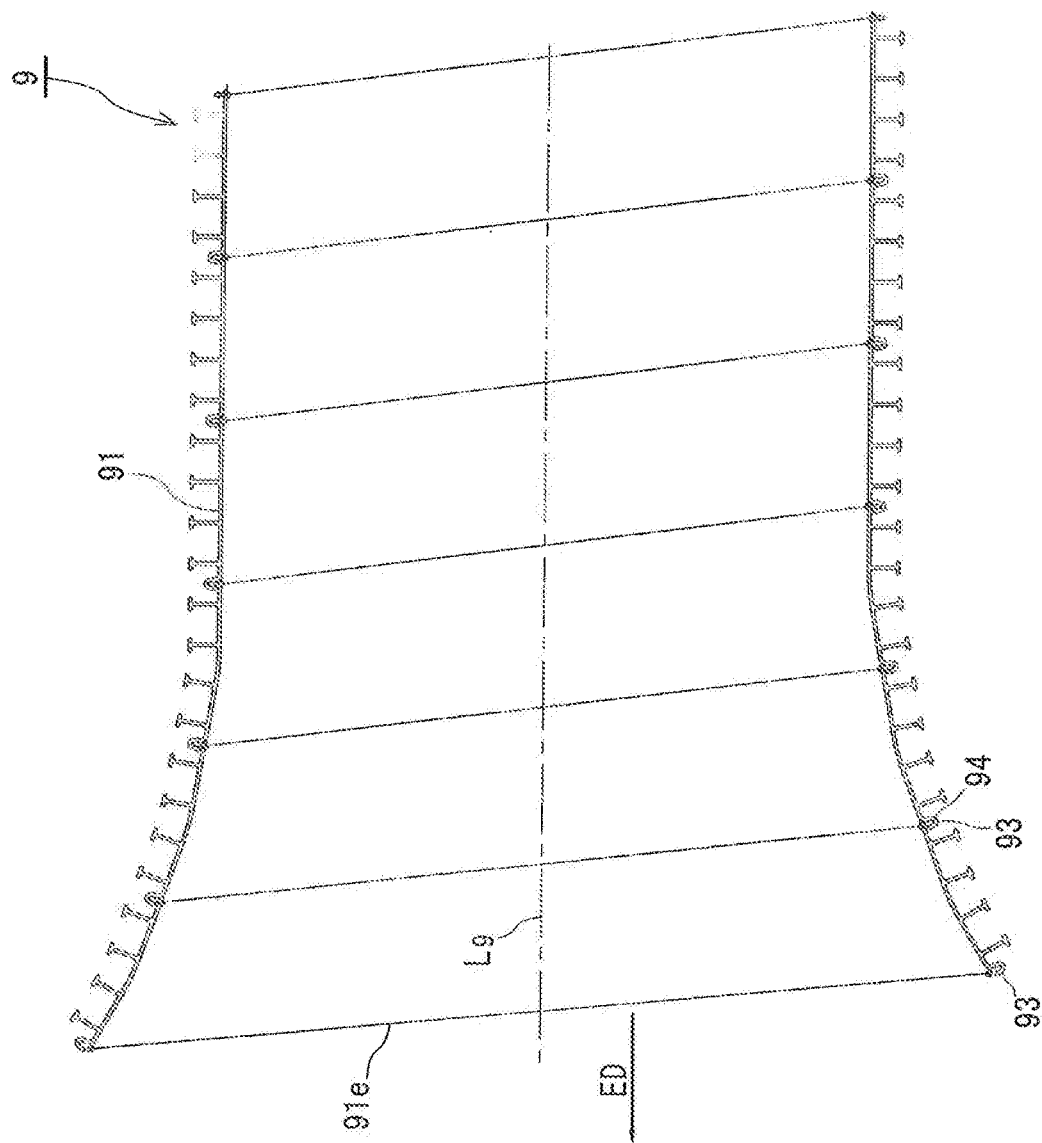
FIG. 10 is a cross-sectional view of the spiral pipe made with enlarged diameter.

For example, as shown in FIG. 1, to make the spiral pipe 9 along an inner surface of a diameter-enlarged change portion 1b, the operating lever 30 is inclined toward the extension front (leftward in FIG. 8) as shown in FIG. 8. Thereby, the apparatus frame 3f, and further the entirety of the pipe-making apparatus 3 is inclined to an outer peripheral side (downward in FIG. 8) toward the extension front. Therefore, portions of the preceding pipe portion 91 and the following strip portion 92 engaged with the pipe making apparatus 3 are bending-deformed so as to be inclined to the outer peripheral side toward the extension front. The fitting position 9q is positioned on the outer peripheral side (pipe outer side, lower side in FIG. 8) with respect to a one-pitch preceding position 9p shifted from the fitting position 9q toward the extension rear (rightward in FIG. 8) by one pitch. Thereby, the spiral pipe 9 can be made with enlarged diameter as shown in FIG. 10.

Generally, the strip member 90 tends to be reduced in diameter by pipe-making. As a countermeasure, it is preferred to incline the operating lever 30 toward the extension front (leftward in FIG. 8) even when making a pipe in a portion of the existing pipe 1 having a constant cross-section. Then, the pipe-making apparatus 3 makes a pipe to enlarge the diameter of the spiral pipe 9, and the tendency to reduce diameter can be cancelled out. Thereby, the spiral pipe 9 can be made closely along the inner peripheral surface of the existing pipe 1.

Therefore, in the pipe-fitting apparatus 3, the spiral pipe 9 can be made without having the diameter thereof reduced without the annular inner periphery limiter of the Patent Document 1 or the radial inner periphery limiter of the Patent Document 2.

Figure 9:
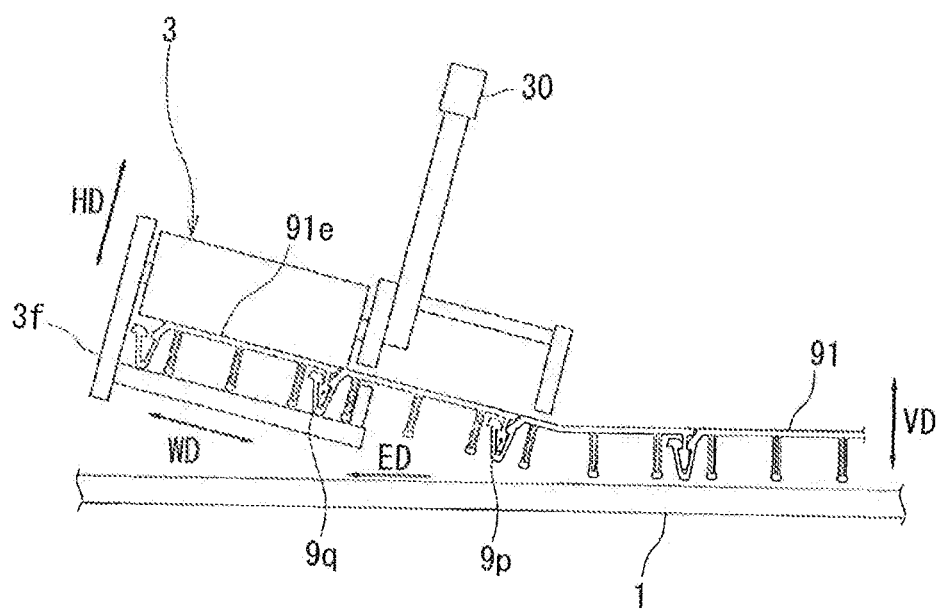
FIG. 9 is a cross-sectional view, showing a pipe in a process of being made with reduced diameter according to the first embodiment.

On the other hand, to make the spiral pipe 9 along an inner surface of a diameter-reduced change portion 1c (FIG. 1), for example, the operating lever 30 is inclined toward the extension rear (rightward in FIG. 8) as shown in FIG. 9. Thereby, the apparatus frame 3f, and further the entirety of the pipe-making apparatus 3 is inclined to an inner peripheral side (upward in FIG. 8) toward the extension front. Therefore, the portions of the preceding pipe portion 91 and the following strip portion 92 engaged with the pipe making apparatus 3 are bending-deformed so as to be inclined to the inner peripheral side toward the extension front. The fitting position 9q is positioned on the inner peripheral side (pipe inner side, upper side in FIG. 8) with respect to the one-pitch preceding position 9p. Thereby, the spiral pipe 9 can be surely made with reduced diameter.

Since the pipe-making apparatus 3 does not have an annular periphery limiter, even if the existing pipe 1 has a non-circular cross-sectional configuration such as quadrangle, for example, a spiral pipe 9 having a non-circular cross-section can be easily made in accordance with an inner peripheral surface of the existing pipe 1.

Other embodiments of the present invention will be described hereinafter. In the description of these embodiments, same reference numerals will be used to indicate features same as those of foregoing embodiments, and explanation thereof will be omitted.

Second Embodiment

Figure 11:
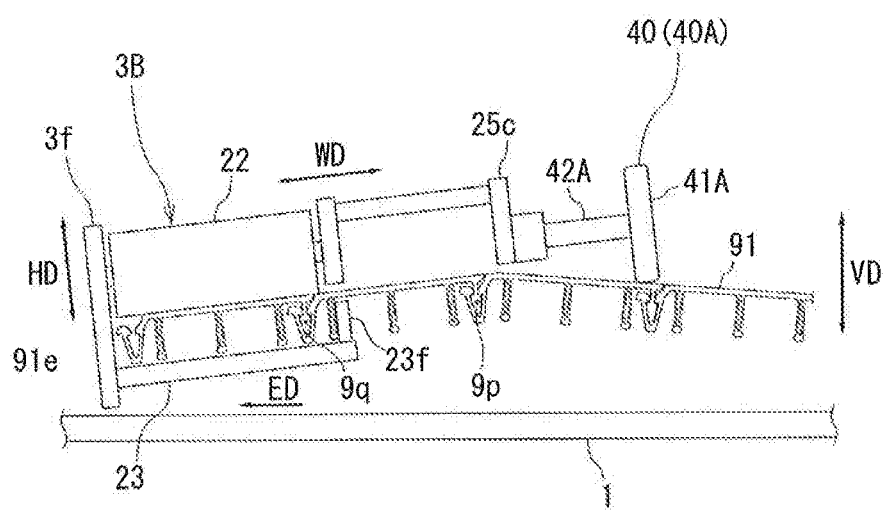
FIG. 11 is a cross-sectional view, showing a pipe in a process of being made with enlarged diameter according to a second embodiment of the present invention.
Figure 12:
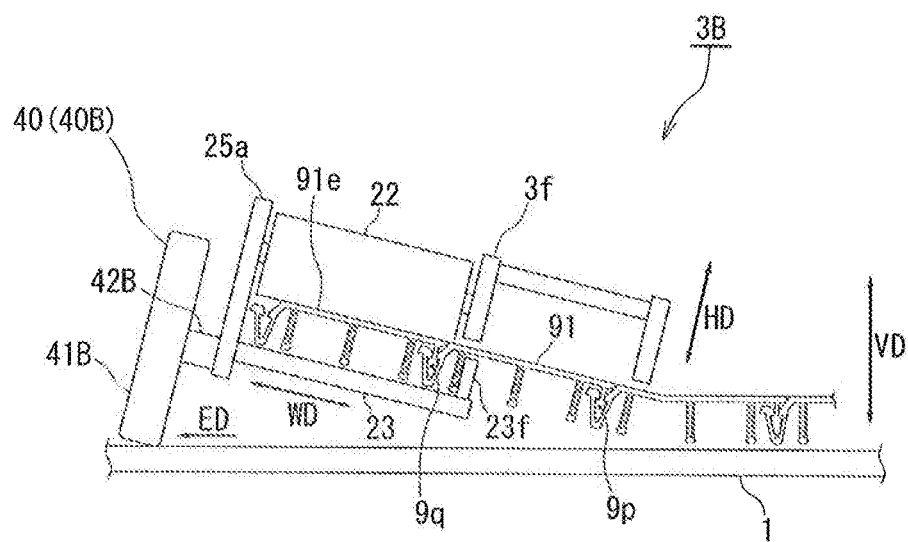
FIG. 12 is a cross-sectional view, showing a pipe in a process of being made with reduced diameter according to the second embodiment.

FIG. 11 and FIG. 12 show a pipe-making apparatus 3B according to a second embodiment of the present invention. The pipe-making apparatus 3B is provided with a strut member 40 (inclining member) as a fitting height adjuster. The strut member 40 is protruded in a pipe inside-outside direction VD from an outside of a first side or a second side of an apparatus frame 3f in a machine width direction WD.

Specifically, the pipe-making apparatus 3B is provided with a strut member 40 for making a pipe with enlarged diameter and a strut member 40 for making a pipe with reduced diameter. To distinguish between the strut members 40, a reference numeral for the strut member 40 for making a pipe with enlarged diameter and components thereof will be followed by "A" and a reference numeral for the strut member 40 for making a pipe with reduced diameter and components thereof will be followed by "B" hereinafter.

As shown in FIG. 11, the pipe-making apparatus 3B making a pipe with enlarged diameter is provided with a strut member 40A disposed in a side portion of the apparatus frame 3f in an extension rear direction (right side in FIG. 11). The strut member 40A includes a strut roller 41A and a roller shaft 42A. The roller shaft 42A is protruded toward the extension rear (rightward in FIG. 11) from a frame plate 25c of the apparatus frame 3f. An axis of the roller shaft 42A is oriented toward the machine width direction WD. The strut roller 41A is disposed in a distal end portion of the roller shaft 42A. The strut roller 41A is formed in a shape of a disk orthogonal to the roller shaft 42A and is rotatable about the roller shaft 42A. A radius of the strut roller 41A is greater than a distance from the axis of the roller shaft 42A to a contact surface of a pipe end inner periphery guide 22 contacted with a spiral pipe 9. A portion of the strut roller 41A is protruded toward a basal portion side with respect to the pipe end inner periphery guide 22 in a machine height direction HD (outward in a pipe inside-outside direction VD).

In this arrangement, the strut roller 41A is abutted against an inner peripheral surface of a preceding pipe portion 91 in the extension rear (right in FIG. 11) with respect to the apparatus frame 3f and struts. Thereby, the apparatus frame 3f, and further the entirety of the pipe-making apparatus 3B is inclined to an outer peripheral side (downward in FIG. 11) toward an extension front (leftward in FIG. 11). Therefore, portions of the preceding pipe portion 91 and a following strip portion 92 engaged with the pipe making apparatus 3B are bending-deformed so as to be inclined to the outer peripheral side toward the extension front. The fitting position 9q is positioned on the outer peripheral side (pipe outer side, lower side in FIG. 11) with respect to a one-pitch preceding position 9p. Thereby, the spiral pipe 9 can be surely made with enlarged diameter (refer to FIG. 10).

As shown in FIG. 12, the pipe-making apparatus 3B making a pipe with reduced diameter is provided with a strut member 40B disposed in a side portion of the apparatus frame 3f in the extension front (left side in FIG. 12). The strut member 40B includes a strut roller 41B and a roller shaft 42B. The roller shaft 42B is protruded toward the extension front (leftward in FIG. 12) from a side portion near a bottom portion of a frame plate 25a in the machine height direction HD. An axis of the roller shaft 42B is oriented toward the machine width direction WD. The strut roller 41B is disposed in a distal end portion of the roller shaft 42B. The strut roller 41B is formed in a shape of a disk orthogonal to the roller shaft 42B. The strut roller 41B is rotatable about the roller shaft 42B.

A generally half portion of the strut roller 41B is protruded toward the basal portion side with respect to the apparatus frame 3f in the machine height direction HD (outward in a pipe inside-outside direction VD). Moreover, the strut roller 41B is abutted against an inner peripheral surface of an existing pipe 1 in the extension front (left in FIG. 12) with respect to the preceding pipe portion 91 and struts. Thereby, the apparatus frame 3f, and further the entirety of the pipe-making apparatus 3B is inclined to an inner peripheral side (upward in FIG. 12) toward the extension front (leftward in FIG. 12). Therefore, portions of the preceding pipe portion 91 and the following strip portion 92 engaged with the pipe making apparatus 3B are bending-deformed to the inner peripheral side toward the extension front. The fitting position 9q is positioned on the inner peripheral side (pipe inner side, upper side in FIG. 12) with respect to the one-pitch preceding position 9p. Thereby, the spiral pipe 9 can be made with reduced diameter.

While the strut roller 41B may be moved away from the existing pipe 1 in a vicinity of a top of the existing pipe 1 during the pipe-making with reduced diameter, an effect of reducing diameter can be obtained by making the strut roller 41B abutted against the inner peripheral surface of the existing pipe 1 by gravity at least in a vicinity of a bottom of the existing pipe 1.

The existing pipe 1 constitutes an outer periphery limiter surrounding the spiral pipe 9.

In the second embodiment, the pipe-making apparatus 3 can be inclined and the spiral pipe 9 can be made with enlarged or reduced diameter without an operator's applying force.

The strut member 40A for enlarging diameter and the strut member 40B for reducing diameter may be attachable to and detachable from the pipe-making apparatus 3B. The strut member 40A for enlarging diameter may be attached for the pipe-making with enlarged diameter and the strut member 40B for reducing diameter may be attached for the pipe-making with reduced diameter.

Both of the strut member 40A for enlarging diameter and the strut member 40B for reducing diameter may be constantly mounted to the pipe-making apparatus 3B. The strut member 40B for reducing diameter may be retractable so as not to be abutted against the existing pipe 1 during the pipe-making with enlarged diameter and the strut member 40A for enlarging diameter may be retractable so as not to be abutted against the preceding pipe portion 91 during the pipe-making with reduced diameter.

The strut member 40 is not limited to the roller, but may be a strut rod.

While the height of the fitting position 9q is adjusted by the width direction WD of the entirety of the pipe-making apparatus 3, 3B's being inclined with respect to the pipe axis $L_9$ in the first and second embodiments, the height of the fitting position 9q may be adjusted by providing a pipe-making apparatus with a pipe end engagement portion to be engaged with an extension end portion 91e of a preceding pipe portion 91 and adjusting a height of the pipe end engagement portion with respect to an apparatus frame 3f as in the embodiments given below.

Third Embodiment

Figure 13:
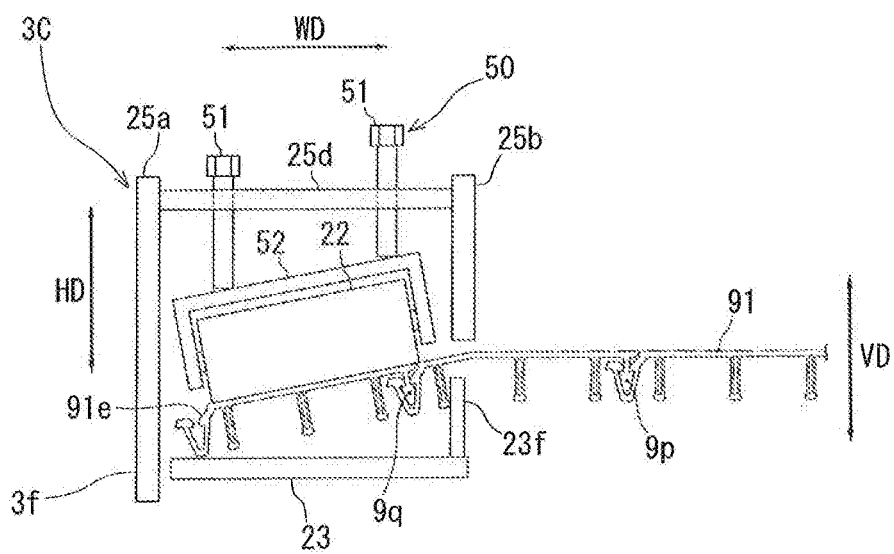
FIG. 13 is a cross-sectional view, showing a pipe in a process of being made with enlarged diameter according to a third embodiment of the present invention.

FIG. 13 shows a pipe-making apparatus 3C according to a third embodiment of the present invention. The pipe-making apparatus 3C includes an inner periphery guide angle adjusting mechanism 50. The inner periphery guide angle adjusting mechanism 50 is connected to a pipe end inner periphery guide 22.

In the pipe-making apparatus 3C, the pipe end inner periphery guide 22 constitutes a pipe end engagement portion.

The inner periphery guide angle adjusting mechanism 50 constitutes a height adjusting mechanism.

The inner periphery guide angle adjusting mechanism 50 and the pipe end inner periphery guide 22 constitute a fitting height adjuster.

Specifically, the inner periphery guide angle adjusting mechanism 50 includes adjustment bolts 51, 51 and an inner periphery guide frame 52. The inner periphery guide frame 52 is laid over the pipe end inner periphery guide 22 from above in a machine height direction HD. The pipe end inner periphery guide 22 is received in the inner periphery guide frame 52. A shaft portion of the pipe end inner periphery guide 22 is rotatably connected to and supported by the inner periphery guide frame 52.

A connecting plate 25d connecting frame plates 25a, 25b of the apparatus frame 3f is provided with two (plurality of) adjustment bolts 51, 51. The two adjustment bolts 51, 51 are spaced from each other in a machine width direction WD of the pipe-making apparatus 30. Respective distal end portions (lower end portions in FIG. 13) of the adjustment bolts 51, 51 are abutted against the inner periphery guide frame 52 or connected to the inner periphery guide frame 52.

By adjusting a threaded amount of the adjustment bolts 51, 51, an angle of an axis of the pipe end inner periphery guide 22 can be adjusted via the inner periphery guide frame 52 so as to be inclined with respect to the machine width direction WD.

As shown in FIG. 13, by the angle adjustment, when the pipe end inner periphery guide 22 is inclined to an outer peripheral side (downward in FIG. 13) toward an extension front (leftward in FIG. 13), for example, a portion of an extending end portion 91e of a preceding pipe portion 91 abutted against the pipe end inner periphery guide 22 is bending-deformed toward to the outer peripheral side toward the extension front. Therefore, the fitting position 9q is positioned on the outer peripheral side (pipe outer side, lower side in FIG. 13) with respect to a one-pitch preceding position 9p. Thereby, the spiral pipe 9 can be made with enlarged diameter (refer to FIG. 10). Moreover, by changing the angle of the pipe end inner periphery guide 22 by the adjustment bolts 51, 51, a degree of enlargement of diameter of the spiral pipe 9 can be adjusted.

Since the pipe end inner periphery guide 22 and the fitting position 9q are close to each other in a propulsion front-rear direction LD of the pipe-making apparatus 3C (direction orthogonal to the plane of FIG. 13), the bending-deformation at the pipe end inner periphery guide 22 affects the fitting position 9q, and a height of the fitting position 9q is adjusted (displaced in a pipe inside-outside direction VD).

Modified Example of the Third Embodiment

Figure 14:
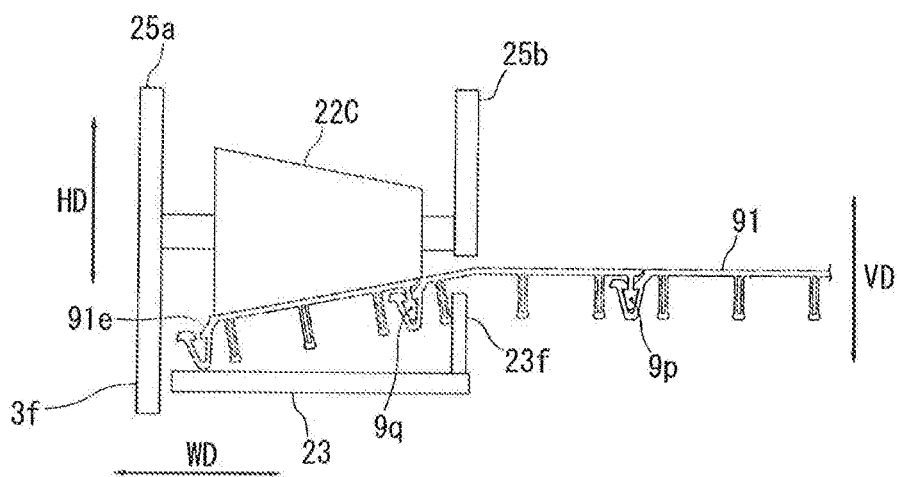
FIG. 14 is a cross-sectional view, showing a pipe in a process of being made with enlarged diameter in a modified example of the third embodiment.

As shown in FIG. 14, when a pipe is made with a constant degree of enlargement of the diameter of the spiral pipe 9, the pipe end inner periphery guide 22C may be formed in a tapered configuration.

The tapered pipe end inner periphery guide 22C constitutes a fitting height adjuster.

Fourth Embodiment

Figure 15:
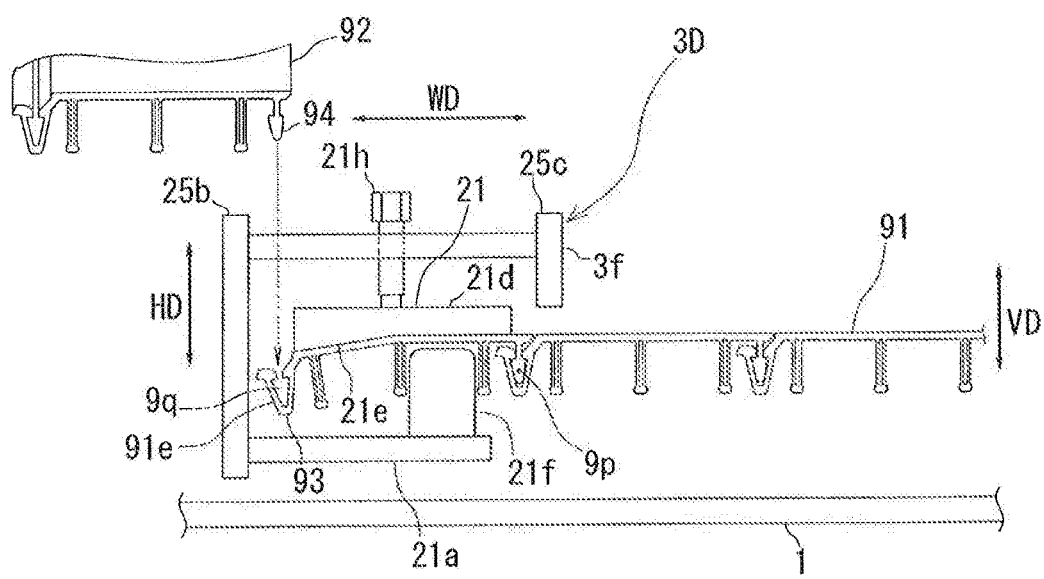
FIG. 15 is a cross-sectional view, showing a pipe in a process of being made with enlarged diameter according to a fourth embodiment of the present invention.
Figure 16:
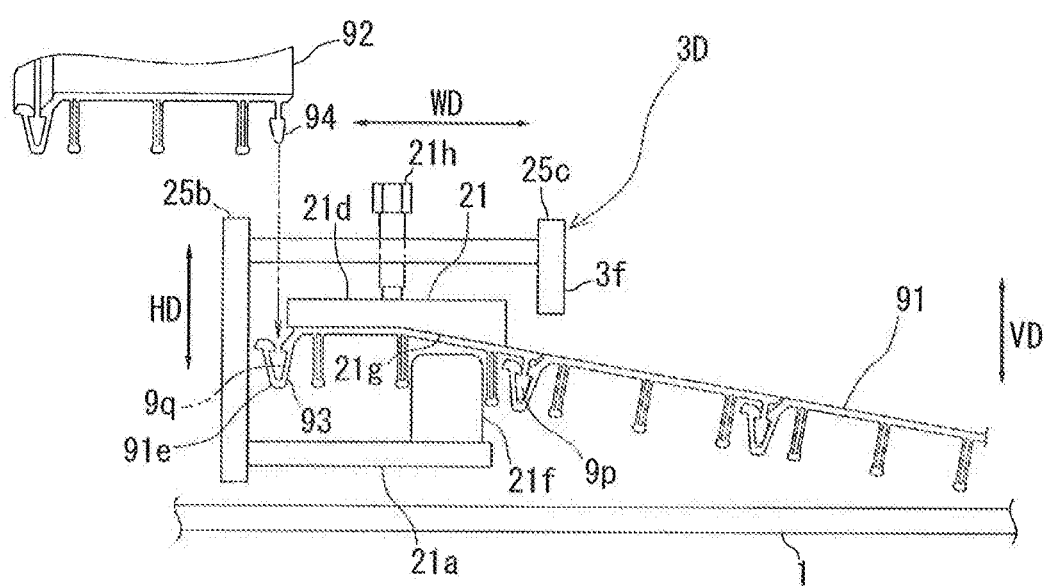
FIG. 16 is a cross-sectional view, showing a pipe in a process of being made with reduced diameter according to the fourth embodiment.

FIG. 15 and FIG. 16 show a pipe-making apparatus 3D according to a fourth embodiment of the present invention. In the pipe-making apparatus 3D, a fitting height adjuster is integrally formed in a pressing member at a propulsion front with respect to the fitting position 9q.

Specifically, as shown in FIG. 15, the pressing member 21d for pipe-making with enlarged diameter has an inclined surface portion 21e (fitting height adjuster) formed in a portion of a surface thereof facing an outer periphery guide plate 21b in an extension front side (left in FIG. 15). The inclined surface portion 21e is inclined to the outer periphery guide plate 21b side (downward in FIG. 15) toward the extension front.

An extending end portion 91e of a preceding pipe portion 91 is pressed against the outer periphery guide plate 21b and bending-deformed along the inclined surface portion 21e, thereby inclined to the outer peripheral side (downward in FIG. 15) toward the extension front. Thereby, the fitting position 9q is positioned on the outer peripheral side (pipe outside, lower side in FIG. 15) with respect to a one-pitch preceding position 9p, and the spiral pipe 9 can be made with enlarged diameter.

As shown in FIG. 16, the pressing member 21d for pipe-making with reduced diameter has an inclined surface portion 21g (fitting height adjuster) formed in a portion of a surface thereof facing the outer periphery guide plate 21b in an extension rear side (right in FIG. 16). The inclined surface portion 21g is inclined to the outer periphery guide plate 21b side (downward in FIG. 16) toward the extension rear.

The extending end portion 91e of the preceding pipe portion 91 is pressed against the outer periphery guide plate 21b and bending-deformed along the inclined surface portion 21g, thereby the spiral pipe 9 can be made with reduced diameter.

Since the pressing member 21d and the fitting position 9q are close to each other in a propulsion front-rear direction LD (direction orthogonal to the planes of FIG. 15 and FIG. 16), the bending-deformation at the pressing member 21d affects the fitting position 9q both in the diameter enlargement and the diameter reduction, and thereby a height of the fitting position 9q is adjusted (displaced in a pipe inside-outside direction VD).

Fifth Embodiment

Figure 17:
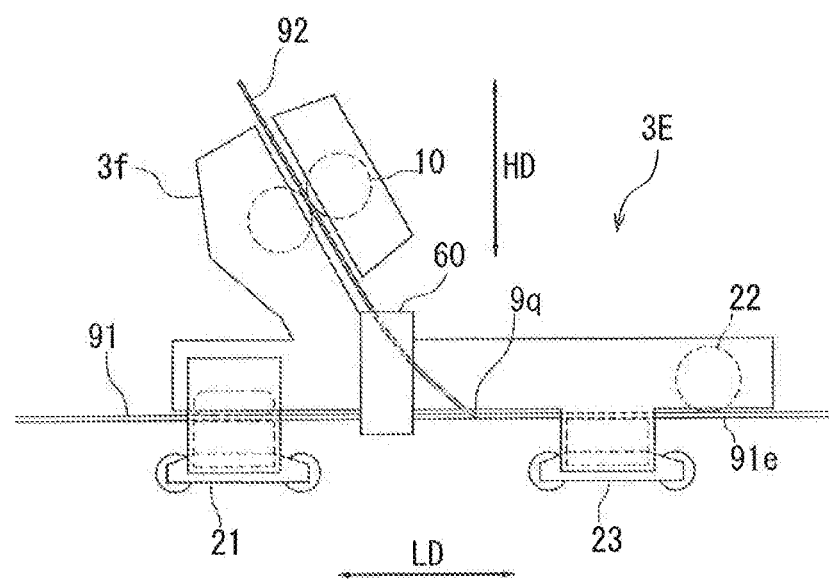
FIG. 17 is a side view of a pipe-making apparatus according to a fifth embodiment of the present invention.
Figure 18:
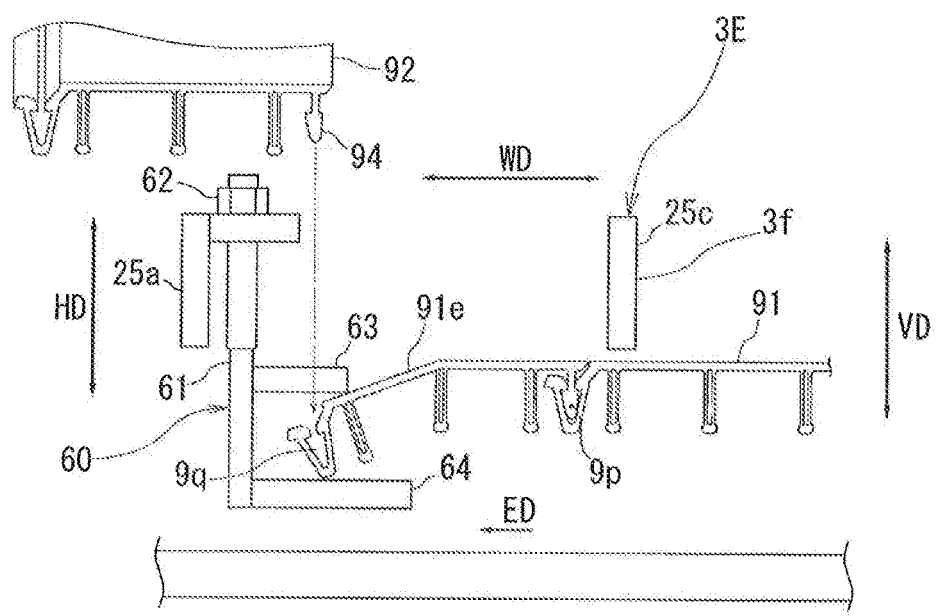
FIG. 18 is a cross-sectional view, showing a pipe in a process of being made with enlarged diameter according to the fifth embodiment.
Figure 19:
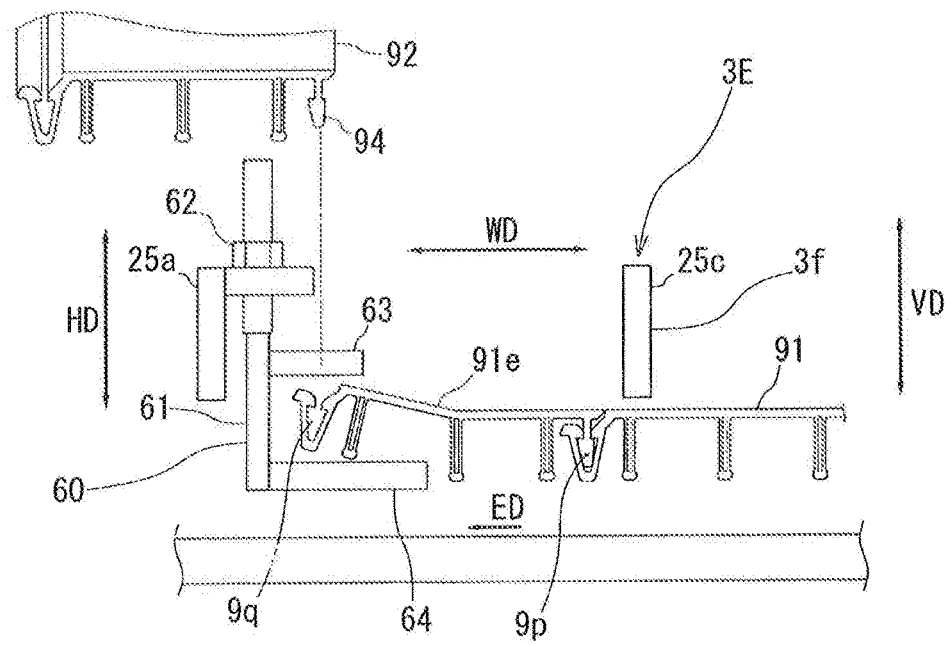
FIG. 19 is a cross-sectional view, showing a pipe in a process of being made with reduced diameter according to the fifth embodiment.

FIG. 17 to FIG. 19 show a pipe-making apparatus 3E according to a fifth embodiment of the present invention.

As shown in FIG. 17, in the pipe-making apparatus 3E, a fitting height adjuster 60 is disposed between a front side pipe end guide 21 and a pipe end outer periphery guide 23. Specifically, the fitting height adjuster 60 is disposed in a propulsion front (left in FIG. 17) with respect to a fitting position 9q.

As shown in FIG. 18 and FIG. 19, the fitting height adjuster 60 includes a lifting and lowering rod 61 (lifting lowering member), a lifting and lowering mechanism 62 (height adjusting mechanism) and retainment members 63, 64 (pipe end engagement portions). The lifting and lowering rod 61 is incorporated in a middle frame plate 25b with an axis thereof oriented to a machine height direction HD). A position of the lifting and lowering rod 61 can be adjusted by the lifting and lowering mechanism 62 in the machine height direction HD, and further in a pipe inside-outside direction VD. The lifting and lowering mechanism 62 may be a linear actuator such as a power cylinder. Alternatively, a male screw may be formed in the lifting and lowering rod 61 with the lifting and lowering mechanism 62 including a nut threadedly engaged with the male screw.

The lifting and lowering rod 61 is provided with the pair of retainment members 63, 64. The retainment members 63, 64 are spaced from each other in a longitudinal direction of the lifting and lowering rod 61. The retainment members 63, 64 are protruded toward an extension rear (rightward in FIG. 18) from the lifting and lowering rod 61 in parallel to each other.

The retainment member 63 on a head portion side in the machine height direction HD is disposed on an inner peripheral side (upper side in FIG. 18) of an extending end portion 91e of a preceding pipe portion 91. The retainment member 64 on a basal side is disposed on an outer peripheral side (lower side in FIG. 18) of the extending end portion 91e. The extending end portion 91e of the preceding pipe portion 91 is caught between the retainment members 63, 64. In other words, the retainment members 63, 64 are retained (engaged) by the extending end portion 91e.

The retainment member 63 on the head portion side is shorter than the retainment member 64 on the basal side, which is not necessarily required.

As shown in FIG. 18, to make a pipe with enlarged diameter, the lifting and lowering rod 61 is slid to the basal side (downward in FIG. 18) in the machine height direction HD by the lifting and lowering mechanism 62. Thereby, the retainment member 63 pushes the extending end portion 91e of the preceding pipe portion 91 to the outer peripheral side (downward in FIG. 18). Therefore, the extending end portion 91e is bending-deformed so as to be inclined to the outer peripheral side (downward in FIG. 18) toward an extension front (leftward in FIG. 18). Thereby, the fitting position 9q is positioned on the outer peripheral side (pipe outer side, lower side in FIG. 18) with respect to a one-pitch preceding position 9p, and the spiral pipe 9 can be made with enlarged diameter.

As shown in FIG. 19, to make a pipe with reduced diameter, the lifting and lowering rod 61 is slid to the head portion side (upward in FIG. 19) in the machine height direction HD by the lifting and lowering mechanism 62. Thereby, the retainment member 64 pushes the extending end portion 91e of the preceding pipe portion 91 to an inner peripheral side (upward in FIG. 18). Therefore, the extending end portion 91e is bending-deformed so as to be inclined to the inner peripheral side (upward in FIG. 18) toward the extension front (leftward in FIG. 18). Thereby, the fitting position 9q is positioned on the inner peripheral side (pipe inner side, upper side in FIG. 18) with respect to the one-pitch preceding position 9p, and the spiral pipe 9 can be made with reduced diameter.

As shown in FIG. 17, in the pipe-making apparatus 3E, the bending-deformation of the extending end portion 91e by the fitting height adjuster 60 takes place in the propulsion front with respect to the fitting position 9q. Since the fitting height adjuster 60 and the fitting position 9q are close to each other, the bending-deformation by the fitting height adjuster 60 affects the fitting position 9q, and a height of the fitting position 9q is adjusted (displaced in the pipe inside-outside direction VD).

Sixth Embodiment

Figure 20:
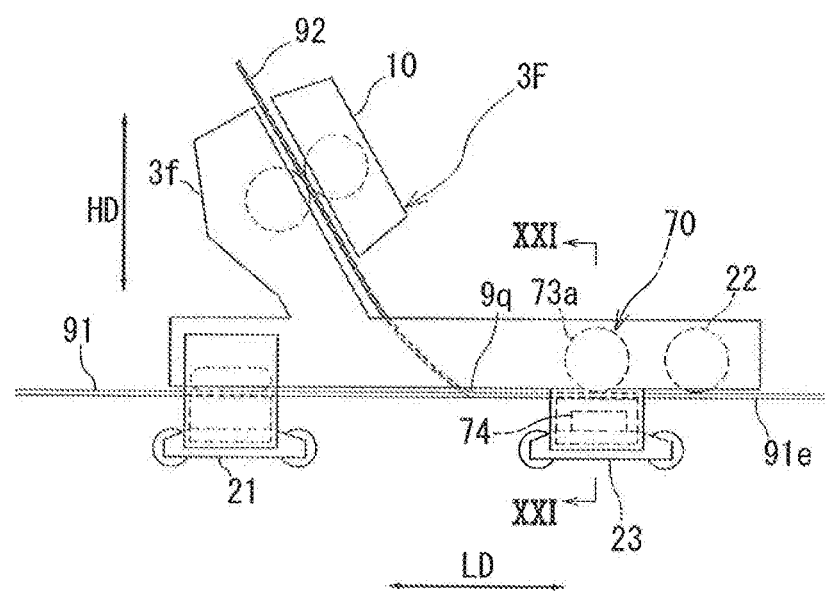
FIG. 20 is a side view of a pipe-making apparatus according to a sixth embodiment of the present invention.
Figure 21:
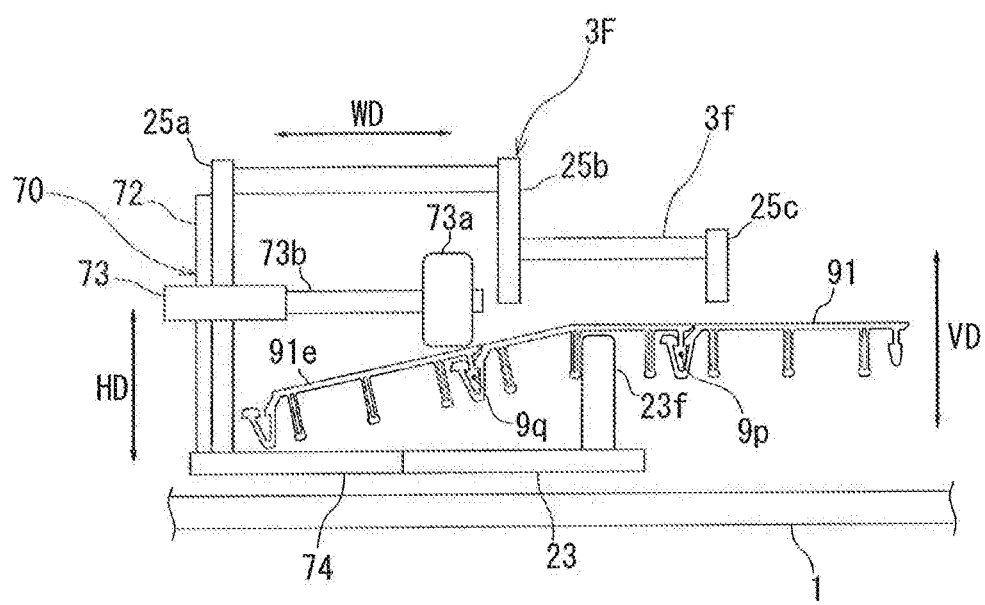
FIG. 21 is a cross-sectional view, showing a pipe in a process of being made with enlarged diameter according to the sixth embodiment.
Figure 22:
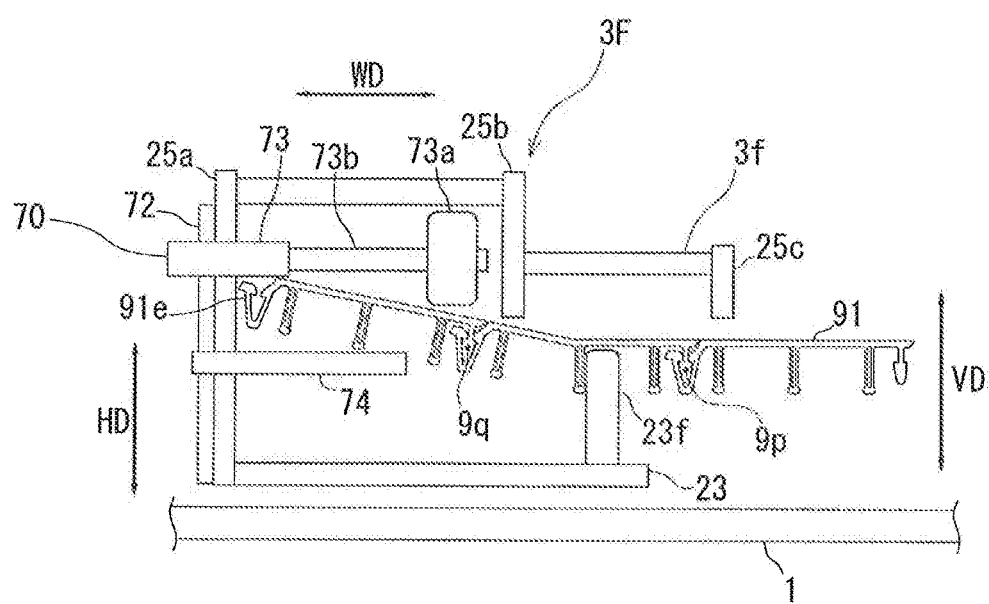
FIG. 22 is a cross-sectional view, showing a pipe in a process of being made with reduced diameter according to the sixth embodiment.

FIG. 20 to FIG. 22 show a pipe-making apparatus 3F according to a sixth embodiment of the present invention.

As shown in FIG. 20, in the pipe-making apparatus 3F, a fitting height adjuster 70 is disposed at a same position as a pipe end outer periphery guide 23 in a propulsion front-rear direction LD (left-right in FIG. 20).

As shown in FIG. 21 and FIG. 22, the fitting height adjuster 70 includes a lifting and lowering mechanism 72 (height adjusting mechanism) and retainment members 73, 74 (pipe end engagement portions). The lifting and lowering mechanism 72 includes a bolt and a linear mechanism and is incorporated in a frame plate 25a. The retainment members 73, 74 are supported by the lifting and lowering mechanism 72 so as to be liftable and lowerable in a machine height direction HD. The inner peripheral side retainment member 73 and the outer peripheral side retainment member 74 are liftable and lowerable in the machine height direction HD independent from each other.

An extending end portion 91e of a preceding pipe portion 91 is caught between the retainment members 73, 74. The retainment members 73, 74 are retained (engaged) by the extending end portion 91e.

Specifically, the inner peripheral side retainment member 73 including a retainment roller 73a and a shaft portion 73b is disposed on an inner peripheral side (upper side in FIG. 21) with respect to the extending end portion 91e. The shaft portion 73b is protruded toward an extension rear (rightward in FIG. 21) from the frame plate 25a. The retainment roller 73a is rotatably disposed in a distal end portion of the shat portion 73b. The retainment roller 73a is disposed near a fitting position 9q. A width of the retainment roller 73a is sufficiently smaller than a width of a strip member 90 and generally equal to a width of a first fitting portion 93.

The outer peripheral side retainment member 74 formed in a form of plate is disposed on an outer peripheral side (lower side in FIG. 21) with respect to the extending end portion 91e. The outer peripheral side retainment member 74 is protruded toward the extension rear (rightward in FIG. 21) from the frame plate 25a. A protruded length (dimension in the left-right direction in FIG. 21) of the outer peripheral side retainment member 74 is shorter than a shaft length of the shaft portion 73b, which is not necessarily required.

As shown in FIG. 21, to make a pipe with enlarged diameter, the retainment members 73, 74 are slid to a basal portion side (downward in FIG. 21) in the machine height direction HD by the lifting and lowering mechanism 72. Thereby, the inner peripheral side retainment member 73 pushes the extending end portion 91e of the preceding pipe portion 91 to an outer peripheral side (downward in FIG. 21). And a retainment protrusion 23f of the pipe end outer periphery guide 23 is caught by a portion preceding the extending end portion 91e by one turn. Thereby, a portion of the preceding pipe portion 91 in an extension front (left in FIG. 21) with respect to the caught portion is bending-deformed so as to be inclined to the outer peripheral side (downward in FIG. 21) toward the extension front. Thereby, the fitting position 9q is positioned on the outer peripheral side (pipe outer side, lower side in FIG. 21) with respect to a one-pitch preceding position 9p, and the spiral pipe 9 can be made with enlarged diameter.

As shown in FIG. 22, to make a pipe with reduced diameter, the retainment members 73, 74 are slid to a head portion side (upward in FIG. 22) in the machine height direction HD by the lifting and lowering mechanism 72. Thereby, the outer peripheral side retainment member 74 pushes the extending end portion 91e of the preceding pipe portion 91 to the inner peripheral side (upward in FIG. 22). Thereby, a portion of the preceding pipe portion 91 in the extension front (left in FIG. 22) with respect to the retainment protrusion 23f is bending-deformed so as to be inclined to the inner peripheral side (upward in FIG. 22) toward the extension front. Thereby, the fitting position 9q is positioned on the inner peripheral side (pipe inner side, upper side in FIG. 22) with respect to the one-pitch preceding position 9p, and the spiral pipe 9 can be made with reduced diameter.

As shown in FIG. 20, both in the diameter enlargement and the diameter reduction, the bending-deformation of the extending end portion 91e takes place in a propulsion rear (right in FIG. 20) with respect to the fitting position 9q, Since the fitting height adjuster 70 and the fitting position 9q are close to each other, the bending-deformation affects the fitting position 9q, and the fitting position 9q is displaced in the pipe inside-outside direction VD.

Seventh Embodiment

FIG. 23 to FIG. 27 show a pipe-making apparatus 3G according to a seventh embodiment of the present invention.

Figure 23:
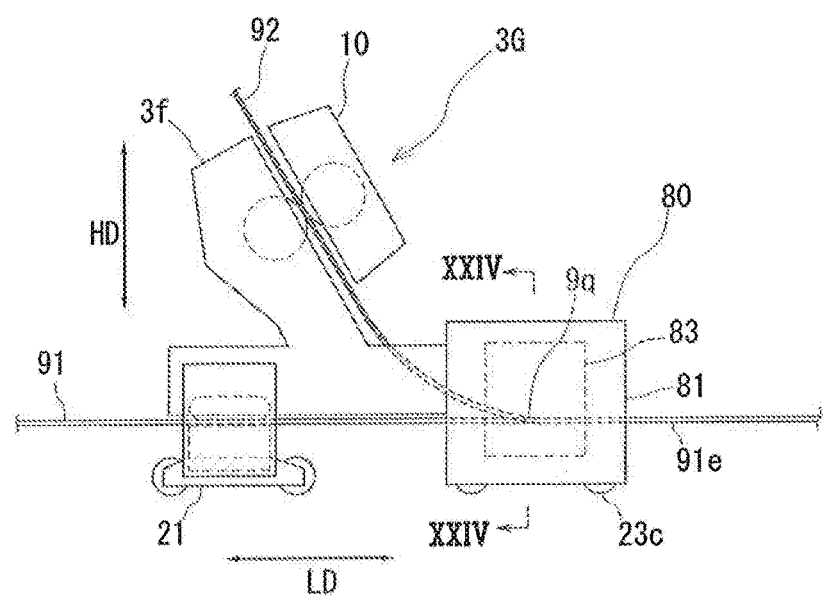
FIG. 23 is a side view of a pipe-making apparatus according to a seventh embodiment of the present invention.
Figure 24:
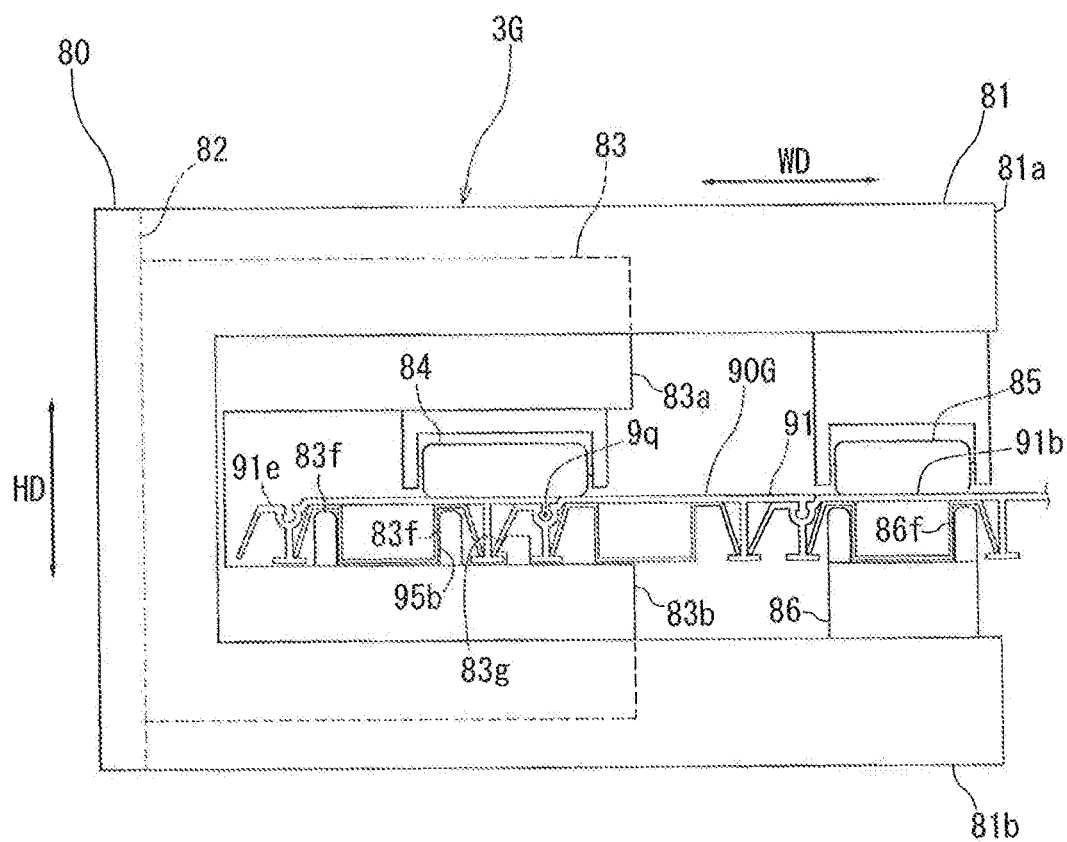
FIG. 24 is a cross-sectional view taken along line XXIV-XXIV of FIG. 23.

As shown in FIG. 23, in the pipe-making apparatus 3G, a fitting height adjuster 80 is disposed in a fitting position 9q. The fitting height adjuster 80 includes a fixed block 81 and a movable block 83. As shown in FIG. 24, the fixed block 81 is formed into a U-shaped configuration or a C-shaped configuration and is fixed to an apparatus frame 3f.

The movable block 83 (pipe end engagement portion) is received inside the fixed block 81. The movable block 83 is smaller than the fixed block 81 and is formed into a U-shaped configuration or a C-shaped configuration. The movable block 83 is liftable and lowerable with respect to the fixed block 81 in a machine height direction HD (upward-downward in FIG. 24) of the pipe-making apparatus 3G. A position of the movable block 83 with respect to the fixed block 81, and further to the apparatus frame 3f, in the machine height direction HD is adjusted by a lifting and lowering mechanism 82 (height adjusting mechanism) including a bolt and a linear guide.

The movable block 83 is provided with a pipe end inner periphery roller 84 (pipe end inner periphery guide) in an upper piece portion 83a thereof.

The movable block 83 has retainment protrusions 83f, 83g formed in a bottom piece portion 83b (pipe end outer periphery guide) thereof.

An upper piece portion 81a of the fixed block 81 is protruded toward an extension rear (rightward in FIG. 24) with respect to the lifting lowering mechanism 82, and a preceding inner periphery roller 85 is disposed in the protruded portion.

A bottom piece portion 81b of the fixed block 81 is protruded toward the extension rear (rightward in FIG. 24) with respect to the lifting lowering mechanism 82, and a preceding outer periphery retainment portion 86 is disposed in the protruded portion. The preceding outer periphery retainment portion 86 has a plurality of retainment protrusions 86f.

A preceding pipe portion 91 is disposed between the upper piece portion 81a and the bottom piece portion 81b of the fixed block 81 and between the upper piece portion 83a and the bottom piece portion 83b of the movable block 83.

The pipe end inner periphery roller 84 is contacted with an inner peripheral surface of an extending end portion 91e of the preceding pipe portion 91 and is laid over a first fitting portion 93 and a second fitting portion 94 at the fitting position.

The retainment protrusions 83f, 83g are retained (engaged) by a groove 95b of the extending end portion 91e.

The preceding inner periphery roller 85 is contacted with an inner peripheral surface of a portion 91b of the preceding pipe portion 91 preceding the extending end portion 91e by one to several pitches. The retainment protrusion 86f is retained (engaged) by the groove 95b of the portion 91b of the preceding pipe portion 91 preceding the extending end portion 91e by one to several pitches.

Figure 27A:
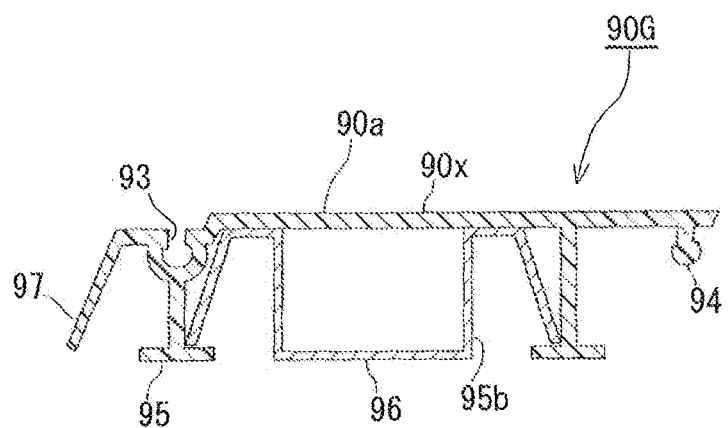
FIG. 27 (a) is a cross-sectional view of a strip member according to the seventh embodiment.
Figure 27B:
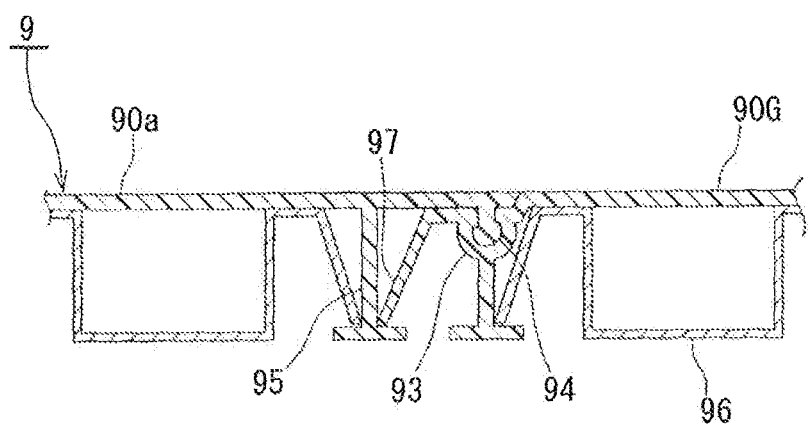

As shown in FIG. 27(a), a strip member 90G of the seventh embodiment includes a reinforcement strip 96 made of steel that is separate from a strip body 90a made of vinyl chloride. The reinforcement strip 96 is attached to an outer peripheral surface of the strip body 90a. The strip member 90G is provided with an auxiliary fitting piece 97 (sub-lock) in an end portion thereof on the first fitting portion 93 side. As shown in FIG. 27(b), the auxiliary fitting piece 97 is engageable with a rib 95.

Figure 25:
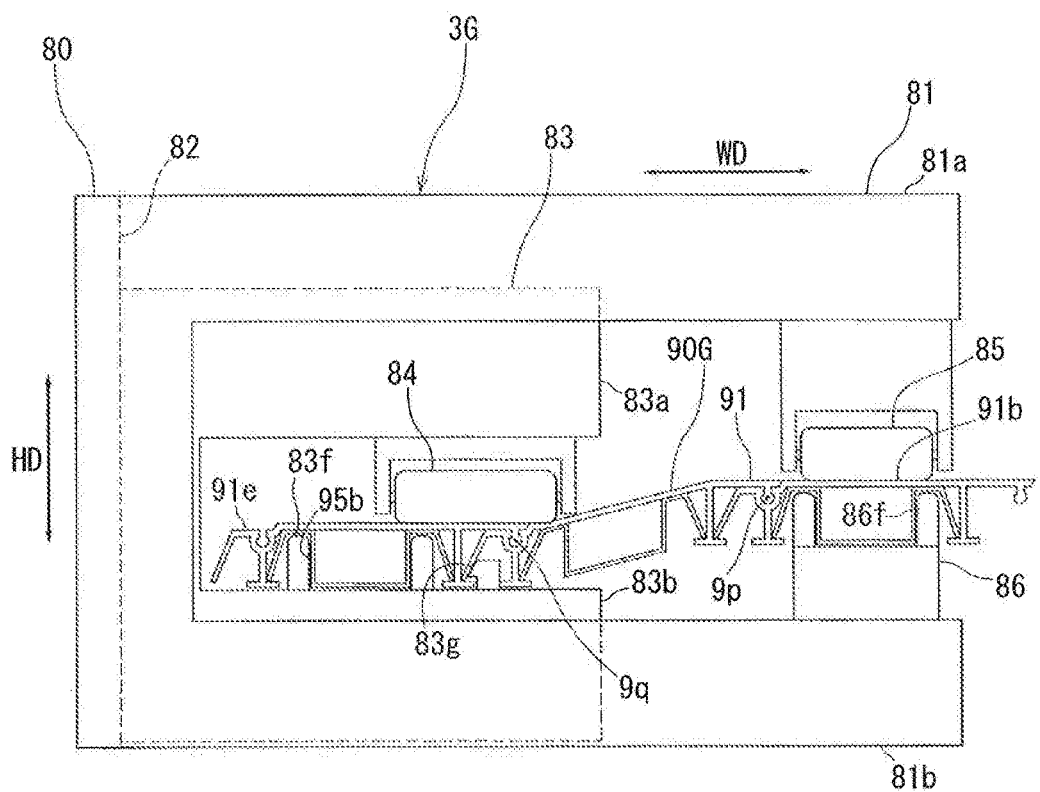
FIG. 25 is a cross-sectional view, showing a pipe in a process of being made with enlarged diameter according to the seventh embodiment.

As shown in FIG. 25, to make a pipe with enlarged diameter with the pipe-making apparatus 3G, the movable block 83 is slid to a basal portion side (downward in FIG. 25) in the machine height direction HD by the lifting and lowering mechanism 82. Thereby, the extending end portion 91e of the preceding pipe portion 91 in the movable block 83 is displaced to an outer peripheral side (downward in FIG. 25) with respect to the apparatus frame 3f. On the other hand, the preceding portion 91b between the preceding inner periphery roller 85 and the preceding outer periphery retainment portion 86 is maintained at a constant position with respect to the apparatus frame 3f. Therefore, a portion between the extending end portion 91e and the preceding portion 91b is bending-deformed so as to be inclined to the outer peripheral side (downward in FIG. 25) toward the extending end portion 91e. Thereby, the fitting position 9q is shifted to the outer peripheral side (pipe outer side, downward in FIG. 25) with respect to a one-pitch preceding position 9p, and a spiral pipe 9 can be made with enlarged diameter.

Figure 26:
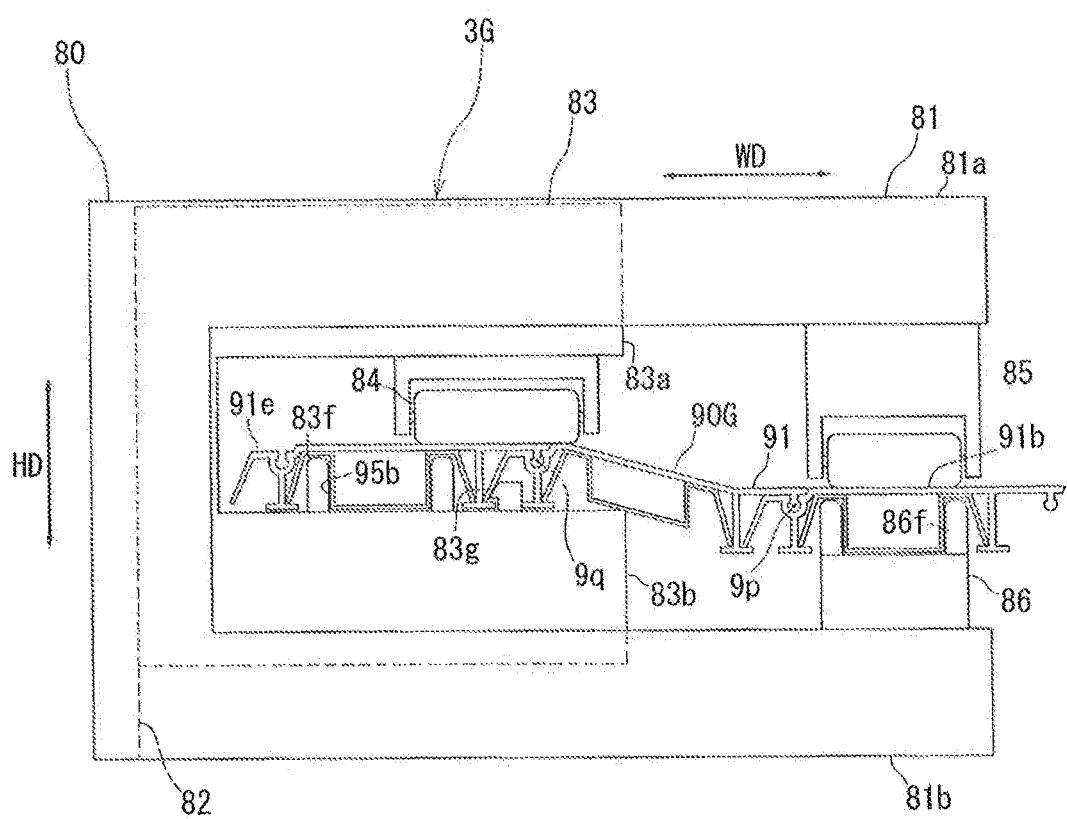
FIG. 26 is a cross-sectional view, showing a pipe in a process of being made with reduced diameter according to the seventh embodiment.

As shown in FIG. 26, to make a pipe with reduced diameter with the pipe-making apparatus 3G, the movable block 83 is slid to a head portion side (upward in FIG. 26) in the machine height direction HD by the lifting and lowering mechanism 82. Thereby, the extending end portion 91e of the preceding pipe portion 91 in the movable block 83 is displaced to an inner peripheral side (upward in FIG. 26) with respect to the apparatus frame 3f. On the other hand, the preceding portion 91b between the preceding inner periphery roller 85 and the preceding outer periphery retainment portion 86 is maintained at a constant position with respect to the apparatus frame 3f. Therefore, the portion between the extending end portion 91e and the preceding portion 91b is bending-deformed so as to be inclined to the inner peripheral side (upward in FIG. 26) toward the extending end portion 91e. Thereby, the fitting position 9q is shifted to the inner peripheral side (pipe, inner side, upward in FIG. 26) with respect to the one-pitch preceding position 9p, and the spiral pipe 9 can be made with reduced diameter.

Eighth Embodiment

FIG. 28 to FIG. 31 show a pipe-making apparatus 3H according to an eighth embodiment of the present invention.

Figure 28:
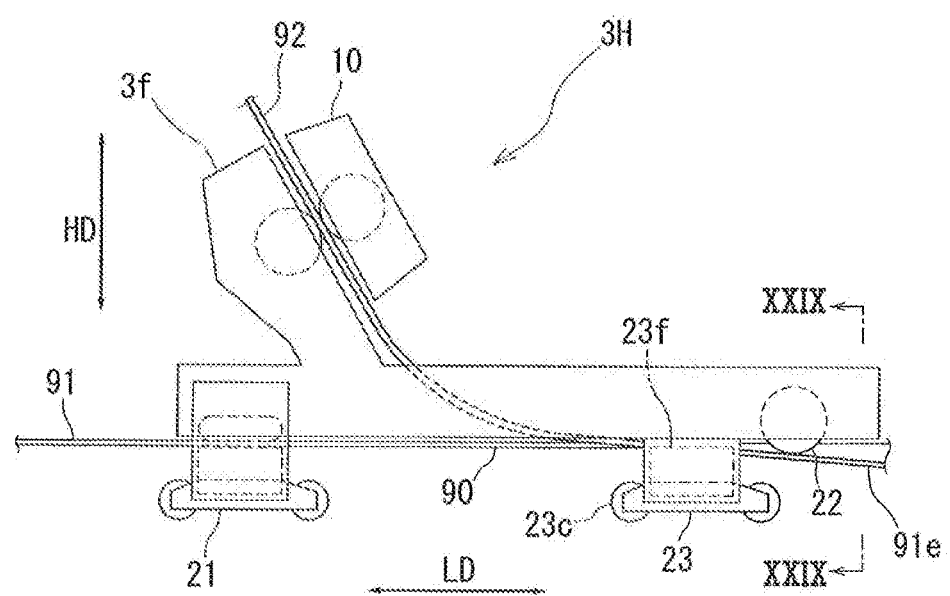
FIG. 28 is a side view of a pipe-making apparatus according to an eighth embodiment of the present invention in a process of making a pipe with enlarged diameter.
Figure 29:
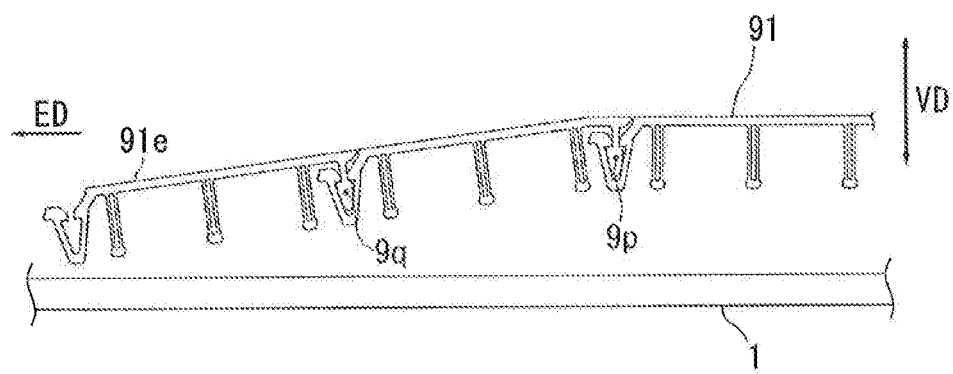
FIG. 29 is a cross-sectional view taken along line XXIX-XXIX of FIG. 28.

As shown in FIG. 28 and FIG. 29, in the pipe-making apparatus 3H, a positional relationship between a pipe end inner periphery guide 22 and a pipe end outer periphery guide 23 of a pipe end guide unit 20 can be modified. The guides 22, 23 constitute a fitting height adjuster.

Specifically, as shown in FIG. 28, to make a pipe with enlarged diameter, the pipe end inner periphery guide 22 is disposed in a propulsion rear (right in FIG. 28) with respect to the pipe end outer periphery guide 23. And the pipe end inner periphery guide 22 is protruded toward a basal portion (downward in FIG. 28) with respect to a head portion (top end) of a retainment protrusion 23f (retainment portion for a strip member 90) of the pipe end outer periphery guide 23 in a machine height direction HD.

Thereby, as shown in FIG. 29, a portion of an extending end portion 91e in the propulsion rear with respect to the pipe end outer periphery guide 23 is inclined to an outer peripheral side (downward in FIG. 29) toward an extension front (leftward in FIG. 29). This deformation affects a fitting position 9q, and the fitting position 9q is positioned on the outer peripheral side (pipe outside, lower side in FIG. 29) with respect to a one-pitch preceding position 9p, and the spiral pipe 9 can be made with enlarged diameter.

Figure 30:
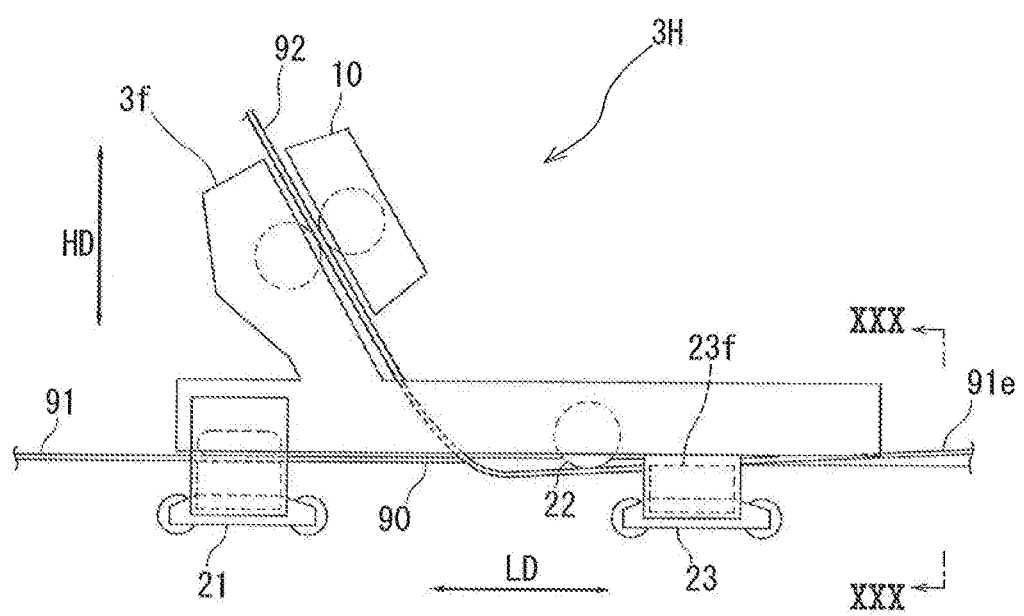
FIG. 30 is a side view of the pipe-making apparatus according to the eighth embodiment in a process of making a pipe with reduced diameter.

As shown in FIG. 30, to make a pipe with reduced diameter, the pipe end inner periphery guide 22 is disposed in a propulsion front (left in FIG. 30) with respect to the pipe end outer periphery guide 23. And the pipe end inner periphery guide 22 is protruded toward the basal portion (downward in FIG. 30) with respect to the head portion (top end) of the retainment protrusion 23f (retainment portion for the strip member 90) of the pipe end outer periphery guide 23 in the machine height direction HD.

Figure 31:
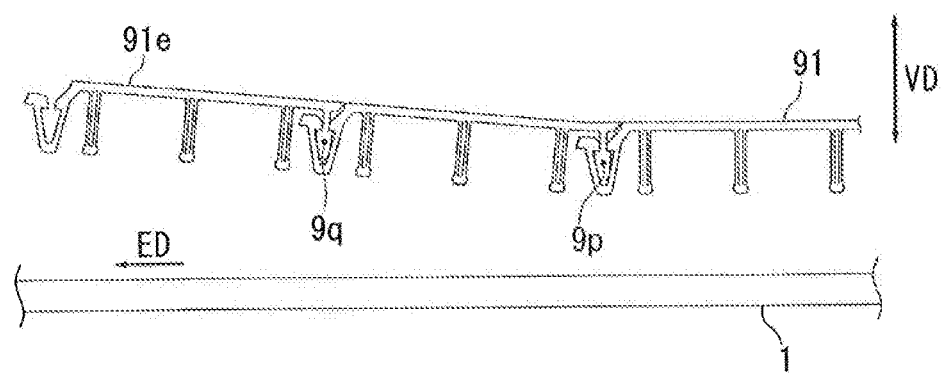
FIG. 31 is a cross-sectional view taken along line XXX-XXX of FIG. 30.

Thereby, as shown in FIG. 31, the portion of the extending end portion 91e in the propulsion rear with respect to the pipe end outer periphery guide 23 is inclined to an inner peripheral side (upward side in FIG. 31) toward the extension front (leftward in FIG. 31). Thereby, the spiral pipe 9 can be made with reduced diameter.

The present invention is not limited to the embodiments described above. Various modifications can be made without departing from the spirit of the invention.

For example, the operating lever 30 of the first embodiment may be disposed in the pipe-making apparatuses 3B to 3H of the other embodiments.

The fitting position 9q may be shifted in the pipe inside-outside direction VD with respect to a position of the preceding pipe portion 91 preceding by several pitches.

An infeed angle of the following strip portion 92 from the drive part 10 to the fitting position 9q may be adjusted by adjusting positions of the rollers 11, 11 of the drive part 10 with respect to the apparatus frame 3f in the propulsion front-rear direction LD and/or the machine height direction HD. By making the infeed angle deeper, the diameter can be enlarged. By making the infeed angle shallower, the diameter can be reduced.

The strip member 90 similar to those in the other embodiments may also be used in the seventh embodiment (FIG. 23 to FIG. 27). The strip member 90G similar to the one in the seventh embodiment may also be used in the embodiments other than the seventh embodiment.

The first fitting portion 93 or the second fitting portion 94 of the strip member 90, 90G may be a component separate from the body of the strip member 90, 90G. The body and the fitting portion 93, 94 may be connected before making a pipe.

EXPLANATION OF REFERENCE NUMERALS

ED extending direction
VD pipe inside-outside direction
LD propulsion front-rear direction
WD machine width direction
HD machine height direction
L9 pipe axis
1 existing pipe (outer periphery limiter)
1c diameter-reduced change portion
3, 3B to 3H pipe-making apparatus
3a pipe-making part
3f apparatus frame
9 rehabilitation pipe (spiral pipe)
9q fitting position
9p one-pitch preceding position
90, 90G strip member
91 preceding pipe portion
91e extending end portion
92 following strip portion
93 first fitting portion
94 second fitting portion
10 drive unit (drive part)
21 front side pipe end guide
21a outer periphery guide portion (pipe end outer periphery guide)
21d pressing member (pipe end inner periphery guide)
21e inclined surface portion (fitting height adjuster)
21g inclined surface portion (fitting height adjuster)
21h bolt (pressing force controller)
23 pipe end outer periphery guide
23f retainment protrusion
22 pipe end inner periphery guide
30 operating lever (fitting height adjuster)
40 strut member (fitting height adjuster)
50 inner periphery guide angle adjusting mechanism (height adjusting mechanism)
60 fitting height adjuster
62 lifting and lowering mechanism (height adjusting mechanism)
63 inner peripheral side retainment member (pipe end engagement portion)
64 outer peripheral side retainment member (pipe end engagement portion)
70 fitting height adjuster
72 lifting and lowering mechanism (height adjusting mechanism)
73 inner peripheral side retainment member (pipe end engagement portion)
74 outer peripheral side retainment member (pipe end engagement portion)
80 fitting height adjuster
82 lifting and lowering mechanism (height adjusting mechanism)
83 movable block (pipe end engagement portion)
83b bottom piece portion (pipe end outer periphery guide)
84 pipe end inner periphery roller (pipe end inner periphery guide)

The invention claimed is:

1. A pipe-making apparatus for making a spiral pipe by spirally winding a strip member while being propelled along a winding direction of the spiral winding, the apparatus comprising:

an apparatus frame disposed in a portion-in-peripheral-direction of an extending end portion of a precedingly spirally formed preceding pipe portion of the strip member;

a pipe-making part disposed in the apparatus frame, the pipe-making part fitting an edge of an unformed following strip portion of the strip member with a corresponding edge of the preceding pipe portion preceding by one turn, the following strip portion following the preceding pipe portion;

a fitting height adjuster variably adjusting a fitting position at which the fitting is done in a machine height direction or a pipe inside-outside direction of the spiral pipe, the machine height direction orthogonal to a propulsion front-rear direction of the apparatus frame; and the pipe-making being done in a condition in which a portion of the extending end portion other than the portion-in-peripheral-direction is released from the pipe-making apparatus, wherein the pipe-making part includes a pair of drive rollers catching the following strip portion therebetween and a pipe end guide guiding the extending end portion, the pair of drive rollers obliquely pushing the following strip portion from an inner peripheral side of the extending end portion of the preceding pipe portion to the fitting position so that a force of the fitting and a propulsive reaction force for the pipe-making apparatus to be propelled are generated by the obliquely pushing by the pair of drive rollers, wherein a machine width direction orthogonal to the propulsion front-rear direction of the apparatus frame and the machine height direction is angle-adjusted by the fitting height adjuster so as to be inclined with respect to a pipe axis of the spiral pipe, wherein the fitting height adjuster includes an operating lever that is protruded from the apparatus frame and graspable, and wherein a basal end portion of the operating lever is fixably connected to a portion between the pair of drive rollers and the fitting position in the apparatus frame.

2. A pipe-making apparatus for making a spiral pipe by spirally winding a strip member while being propelled along a winding direction of the spiral winding, the apparatus comprising:
- an apparatus frame disposed in a portion-in-peripheral-direction of an extending end portion of a precedingly spirally formed preceding pipe portion of the strip member;
- a pipe-making part disposed in the apparatus frame, the pipe-making part fitting an edge of an unformed following strip portion of the strip member with a corresponding edge of the preceding pipe portion preceding by one turn, the following strip portion following the preceding pipe portion;
- a fitting height adjuster variably adjusting a fitting position at which the fitting is done in a machine height direction or a pipe inside-outside direction of the spiral pipe, the machine height direction orthogonal to a propulsion front-rear direction of the apparatus frame; and
- the pipe-making being done in a condition in which a portion of the extending end portion other than the portion-in-peripheral-direction is released from the pipe-making apparatus,
- wherein a machine width direction orthogonal to the propulsion front-rear direction of the apparatus frame and the machine height direction is angle-adjusted by the fitting height adjuster so as to be inclined with respect to a pipe axis of the spiral pipe,
- wherein the fitting height adjuster includes a strut member protruded from an outside of a first side or a second side in the machine width direction toward a pipe-outside in the pipe inside-outside direction, the strut member strutting by abutting against an inner peripheral surface of an outer periphery limiter surrounding the spiral pipe or an inner peripheral surface of the preceding pipe portion.

3. A pipe-making apparatus for making a spiral pipe by spirally winding a strip member while being propelled along a winding direction of the spiral winding, the apparatus comprising:
- an apparatus frame disposed in a portion-in-peripheral-direction of an extending end portion of a precedingly spirally formed preceding pipe portion of the strip member;
- a pipe-making part disposed in the apparatus frame, the pipe-making part fitting an edge of an unformed following strip portion of the strip member with a corresponding edge of the preceding pipe portion preceding by one turn, the following strip portion following the preceding pipe portion;
- a fitting height adjuster variably adjusting a fitting position at which the fitting is done in a machine height direction or a pipe inside-outside direction of the spiral pipe, the machine height direction orthogonal to a propulsion front-rear direction of the apparatus frame; and
- the pipe-making being done in a condition in which a portion of the extending end portion other than the portion-in-peripheral-direction is released from the pipe-making apparatus, wherein the pipe-making part includes a pair of drive rollers catching the following strip portion therebetween and a pipe end guide guiding the extending end portion, the pair of drive rollers obliquely pushing the following strip portion from an inner peripheral side of the extending end portion of the preceding pipe portion to the fitting position so that a force of the fitting and a propulsive reaction force for the pipe-making apparatus to be propelled are generated by the obliquely pushing by the pair of drive rollers,
- wherein the apparatus frame includes a drive unit frame provided with the pair of driving rollers and a guide frame provided with the pipe end guide,
- wherein the fitting height adjuster includes
- a pipe end engagement portion provided for engagement with the extending end portion of the preceding pipe portion, wherein the pipe end engagement portion includes an inner peripheral side retainment member adopted to retain the extending end portion from the inner peripheral side and an outer peripheral side retainment member adopted to retain the extending end portion from an outer peripheral side, and
- a height adjusting mechanism that adjusts a position of the pipe end engagement portion with respect to the apparatus frame in the machine height direction, wherein the height adjusting mechanism includes a lifting and lowering mechanism that supports the inner peripheral side retainment member and the outer peripheral side retainment member so as to be liftable and lowerable in the machine height direction with respect to the drive unit frame.

4. The pipe-making apparatus according to claim 3, wherein the pipe end engagement portion is disposed in a vicinity of and in front of the fitting position in the propulsion front-rear direction.

5. The pipe-making apparatus according to claim 3, wherein the pipe end engagement portion is disposed in a vicinity of and behind the fitting position in the propulsion front-rear direction.

6. The pipe-making apparatus according to claim 3, wherein the pipe end engagement portion is disposed at the fitting position.

7. The pipe-making apparatus according to claim 3, wherein the pipe end guide includes a guide in front of the fitting position in the propulsion front-rear direction and a guide behind the fitting position in the propulsion front-rear direction.

8. A pipe-making apparatus for making a spiral pipe by spirally winding a strip member while being propelled along a winding direction of the spiral winding, the apparatus comprising:
- an apparatus frame disposed in a portion-in-peripheral-direction of an extending end portion of a precedingly spirally formed preceding pipe portion of the strip member;
- a pipe-making part disposed in the apparatus frame, the pipe-making part fitting an edge of an unformed following strip portion of the strip member with a corresponding edge of the preceding pipe portion preceding by one turn, the following strip portion following the preceding pipe portion;
- a fitting height adjuster variably adjusting a fitting position at which the fitting is done in a machine height direction or a pipe inside-outside direction of the spiral pipe, the machine height direction orthogonal to a propulsion front-rear direction of the apparatus frame; and
- the pipe-making being done in a condition in which a portion of the extending end portion other than the portion-in-peripheral-direction is released from the pipe-making apparatus, wherein the pipe-making part includes a pair of drive rollers catching the following strip portion therebetween and a pipe end guide guiding the extending end portion, the pair of drive rollers obliquely pushing the following strip portion from an inner peripheral side of the extending end portion of the preceding pipe portion to the fitting position so that a force of the fitting and a propulsive reaction force for the pipe-making apparatus to be propelled are generated by the obliquely pushing by the pair of drive rollers, wherein the pipe end guide includes a pipe end inner periphery guide having a roller contacted with an inner peripheral surface of the extending end portion of the preceding pipe portion and wherein the fitting height adjuster includes an inner periphery guide angle adjusting mechanism that adjusts an angle of an axis of the pipe end inner periphery guide so as to be inclined with respect to a machine width direction orthogonal to the propulsion front-rear direction of the apparatus frame and the machine height direction, wherein the inner periphery guide angle adjusting mechanism includes a plurality of adjustment bolts being provided on the apparatus frame and an inner periphery guide frame being laid over the roller of the pipe end inner periphery guide such that the roller is rotatably supported by the inner periphery guide frame, wherein the adjustment bolts are spaced from each other in the machine width direction, and wherein respective distal end portions of the adjustment bolts are abutted against the inner periphery guide frame or connected to the inner periphery guide frame.

9. A pipe-making apparatus for making a spiral pipe by spirally winding a strip member while being propelled along a winding direction of the spiral winding, the apparatus comprising:

an apparatus frame disposed in a portion-in-peripheral-direction of an extending end portion of a precedingly spirally formed preceding pipe portion of the strip member;

a pipe-making part disposed in the apparatus frame, the pipe-making part fitting an edge of an unformed following strip portion of the strip member with a corresponding edge of the preceding pipe portion preceding by one turn, the following strip portion following the preceding pipe portion, wherein the pipe-making part includes a drive roller and a pipe end guide, the drive roller obliquely pushing the following strip portion from an inner peripheral side of the extending end portion of the preceding pipe portion to a fitting position at which the fitting is done, the pipe end guide guiding the extending end portion;

a fitting height adjuster variably adjusting the fitting position in a machine height direction or a pipe inside-outside direction of the spiral pipe, the machine height direction orthogonal to a propulsion front-rear direction of the apparatus frame; and the pipe-making being done in a condition in which a portion of the extending end portion other than the portion-in-peripheral-direction is released from the pipe-making apparatus, wherein the pipe end guide includes a pipe end inner periphery guide that guides the extending end portion from the inner peripheral side and a pipe end outer periphery guide that guides the extending end portion from an outer peripheral side, the pipe end inner periphery guide is protruded toward a pipe—outside with respect to a retainment portion of the pipe end outer periphery guide for the strip member in the pipe inside—outside direction and selectively placed either in front of or behind the pipe end outer periphery guide in the propulsion front-rear direction, and the pipe end inner periphery guide and the pipe end outer periphery guide constitute the fitting height adjuster.

10. A pipe-making method for making a spiral pipe from a strip member with a pipe-making apparatus, the method comprising steps of:

fitting an edge of an unformed following strip portion of the strip member with a corresponding edge of a precedingly spirally formed preceding pipe portion preceding by one turn, the following strip portion following the preceding pipe portion;

propelling the pipe-making apparatus along a winding direction of the spiral pipe accompanying the fitting; and variably adjusting a fitting position at which the fitting is done in a machine height direction or a pipe inside-outside direction of the spiral pipe, the machine height direction orthogonal to a propulsion front-rear direction of the pipe-making apparatus;

wherein the pipe is made in a condition in which a portion of an extending end portion of the preceding pipe portion other than a portion in which the pipe-making apparatus is disposed in a peripheral direction is released from the pipe-making apparatus, wherein a machine width direction orthogonal to the propulsion front-rear direction of the pipe-making apparatus and the machine height direction is angle-adjusted so as to be inclined with respect to a pipe axis of the spiral pipe in the variably adjusting step, wherein the angle is adjusted with an operating lever disposed on the pipe-making apparatus so as to be protruded therefrom, and wherein the operating lever is inclined toward a front in an extending direction where the spiral pipe is extending when the spiral pipe is made with enlarged diameter, and the operating lever is inclined toward a rear in the extending direction when the spiral pipe is made with reduced diameter.

11. A pipe-making apparatus for making a spiral pipe by spirally winding a strip member while being propelled along a winding direction of the spiral winding, the apparatus comprising:

an apparatus frame disposed in a portion-in-peripheral-direction of an extending end portion of a precedingly spirally formed preceding pipe portion of the strip member;

a pipe-making part disposed in the apparatus frame, the pipe-making part fitting an edge of an unformed following strip portion of the strip member with a corresponding edge of the preceding pipe portion preceding by one turn, the following strip portion following the preceding pipe portion;

a fitting height adjuster variably adjusting a fitting position at which the fitting is done in a machine height direction or a pipe inside-outside direction of the spiral pipe, the machine height direction orthogonal to a propulsion front-rear direction of the apparatus frame; and the pipe-making being done in a condition in which a portion of the extending end portion other than the portion-in-peripheral-direction is released from the pipe-making apparatus, wherein the pipe-making part includes a pair of drive rollers catching the following strip portion therebetween and a pipe end guide guiding the extending end portion, the pair of drive rollers obliquely pushing the following strip portion from an inner peripheral side of the extending end portion of the preceding pipe portion to the fitting position so that a force of the fitting and a propulsive reaction force for the pipe-making apparatus to be propelled are generated by the obliquely pushing by the pair of drive rollers, wherein the pipe end guide includes a pipe end inner periphery guide that guides the extending end portion from the inner peripheral side, the pipe end inner periphery guide is formed in a tapered configuration.

* * * * *